(12) United States Patent
Fink et al.

(10) Patent No.: US 6,900,268 B2
(45) Date of Patent: May 31, 2005

(54) METHOD OF GRAFTING ETHYLENICALLY UNSATURATED CARBOXYLIC ACID DERIVATIVES ONTO THERMOPLASTIC USING HYDROXYLAMINE ESTERS

(75) Inventors: Jochen Fink, Nussloch (DE); Michael Roth, Lautertal (DE); Rudolf Pfaendner, Rimbach (DE); Peter Nesvadba, Marly (CH); Andreas Kramer, Meyriez (CH)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 3 days.

(21) Appl. No.: 10/477,364

(22) PCT Filed: May 7, 2002

(86) PCT No.: PCT/EP02/05037

§ 371 (c)(1),
(2), (4) Date: Nov. 12, 2003

(87) PCT Pub. No.: WO02/092653

PCT Pub. Date: Nov. 21, 2002

(65) Prior Publication Data

US 2004/0138384 A1 Jul. 15, 2004

(30) Foreign Application Priority Data

May 15, 2001 (CH) ................................. 0891/01

(51) Int. Cl.⁷ ..................... C08F 2/38; C08L 51/06; C08K 5/32
(52) U.S. Cl. .................. 525/69; 525/64; 526/215; 526/217; 526/220
(58) Field of Search ............ 525/69, 64; 526/215, 526/217, 220

(56) References Cited

U.S. PATENT DOCUMENTS

2003/0216494 A1   11/2003   Roth et al. ................. 524/95

FOREIGN PATENT DOCUMENTS

| EP | 0849318 | 6/1998 |
|----|---------|--------|
| EP | 0924228 | 6/1999 |
| WO | 00/14134 | 3/2000 |
| WO | 00/14135 | 3/2000 |

Primary Examiner—James J. Seidleck
Assistant Examiner—Olga Asinovsky
(74) Attorney, Agent, or Firm—Tyler A. Stevenson

(57) ABSTRACT

The invention relates to a method of grafting unsaturated carboxylic acid derivatives onto thermoplastic polymers, which comprises heating a mixture of thermoplastic polymer, unsaturated carboxylic acid or carboxylic acid derivative and a hydroxy-lamine ester having at least one structural unit of formula (I) or (I') wherein X is hydrogen, $C_1$–$C_{36}$alkyl, $C_2$–$C_{36}$alkenyl, $C_2$–$C_{18}$alkynyl, $C_6$–$C_{10}$aryl, —O—$C_1$–$C_{18}$alkyl, —O—$C_6$–$C_{10}$aryl, —NH—$C_1$–$C_{18}$alkyl, —NH—$C_6$–$C_{10}$aryl, —N($C_1$–$C_6$alkyl)$_2$; X' is a direct bond or $C_1$–$C_{36}$alkylene, $C_2$–$C_{36}$alkenylene, $C_2$–$C_{36}$alkynylene, —($C_1$–$C_6$alkylene)-phenyl-($C_1$–$C_6$alkylene) or a group in a processing apparatus for thermoplastic polymers, to above the softening point/melting point of the thermoplastic polymer and allowing the components of the mixture to react with one another

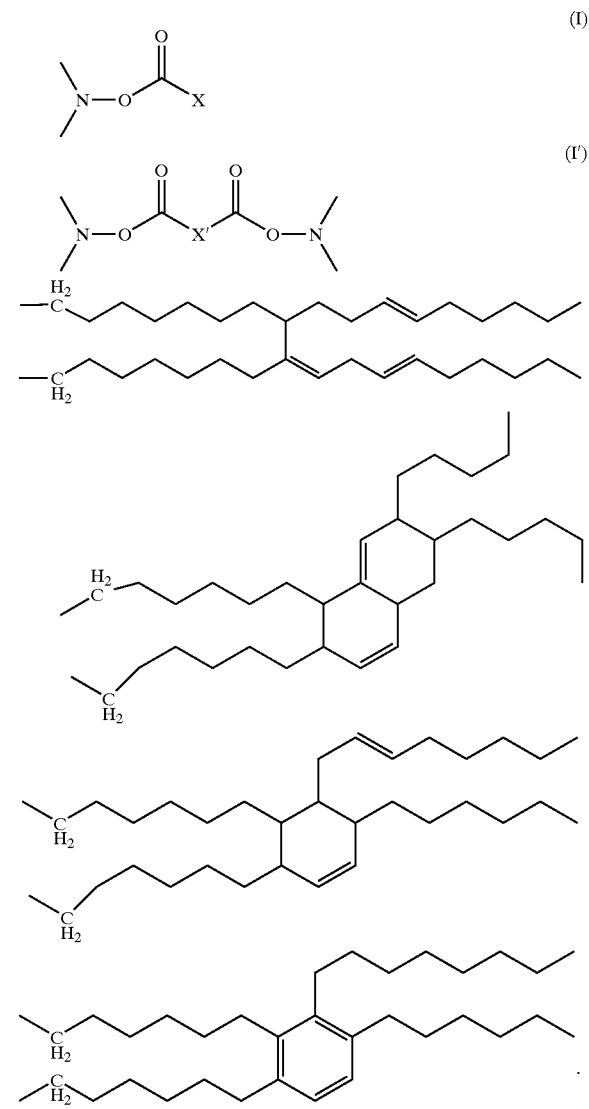

17 Claims, No Drawings

METHOD OF GRAFTING ETHYLENICALLY UNSATURATED CARBOXYLIC ACID DERIVATIVES ONTO THERMOPLASTIC USING HYDROXYLAMINE ESTERS

The invention relates to a method of grafting ethylenically unsaturated carboxylic acid derivatives onto thermoplastic polymers using hydroxylamine esters. The invention relates also to a polymer composition comprising such hydroxylamine esters and to their use in the grafting reaction.

A customary method of modifying plastics and their properties is reactive extrusion. In that method, additives are added to the thermoplastic polymer during extrusion in order to modify the properties of the polymer. That can be accomplished, for example, in a reaction wherein an unsaturated compound is grafted onto the polymer. Such reactive grafting processes are customarily performed by the combined use of an unsaturated compound and a peroxide as a free-radical-former. When the polymer is modified with functional monomers, for example maleic anhydride, copolymers are obtained that are used as compatibilisers or adhesion promoters.

Current methods have crucial disadvantages, however, which are attributable to the use of peroxides as free-radical-formers. Whilst undesirable side reactions influence the processing behaviour of the polymers (for example, cross-linking/gel formation or polymer breakdown may occur depending on the type of polymer used), a deterioration in the long-term stability of the polymer is caused by reaction products of the peroxide and by peroxide residues. Furthermore, considerable safety precautions have to be taken in the case of plastics processing with the addition of peroxides.

Peroxide-initiated grafting reactions provide, in the case of polypropylene as the thermoplastic polymer, for example, a yield of from 0.2% to about 1.6% of bound maleic anhydride (MAH). In U.S. Pat. No. 5,001,197, for example, that grafted amount of maleic anhydride is compared with the resulting melt flow index (MFR value) and it is shown that the peroxide causes considerable breakdown of the polymer even when only small amounts of MAH have been grafted.

WO 00/14134 and WO 00/14135 describe grafting reactions wherein stable free nitroxyl radicals optionally together with peroxides, or alkoxyamines together with peroxides, are used. The use of hydroxylamine esters as initiators of the grafting reaction is not, however, mentioned therein.

The present invention provides a method that increases the grafting yield of unsaturated carboxylic acid derivatives on the thermoplastic polymer without, at the same time, giving rise to any significant impairment of the mechanical properties of the polymer that are achieved by polymer breakdown and/or cross-linking. The disadvantages of peroxide-induced grafting are completely avoided. For example, no increased protective measures are required when hydroxylamine esters are used or stored. The melt flow values are only slightly changed, which means that the mechanical properties of the thermoplastic polymer are substantially retained. Using the method according to the invention, the amounts of ethylenically unsaturated carboxylic acid derivatives that can be grafted are significantly greater than in methods described in the prior art.

The invention relates to a method of grafting unsaturated carboxylic acid derivatives onto thermoplastic polymers, which method comprises heating a mixture of thermoplastic polymer, unsaturated carboxylic acid or carboxylic acid derivative and a hydroxylamine ester having at least one structural unit of formula (I) or (I')

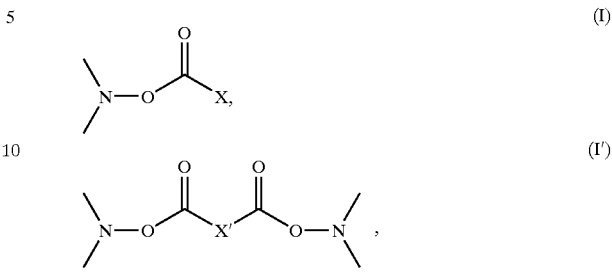

wherein
X is hydrogen, $C_1$–$C_{36}$alkyl, $C_1$–$C_{36}$alkyl which is substituted by halogen, $C_5$–$C_{12}$cycloalkyl, $C_7$–$C_{12}$bicyclo- or tricycloalkyl, $C_2$–$C_{36}$alkenyl, $C_2$–$C_{18}$alkynyl, $C_6$–$C_{10}$aryl, —O—$C_1$–$C_{18}$alkyl, —O—$C_6$–$C_{10}$aryl, —NH—$C_1$–$C_{18}$alkyl, —NH—$C_6$–$C_{10}$aryl, —N($C_1$–$C_6$alkyl)$_2$;
X' is a direct bond or $C_1$–$C_{36}$alkylene, $C_2$–$C_{36}$alkenylene, $C_2$–$C_{36}$alkynylene, —($C_1$–$C_6$alkylene)-phenyl-($C_1$–$C_6$alkylene) or a group

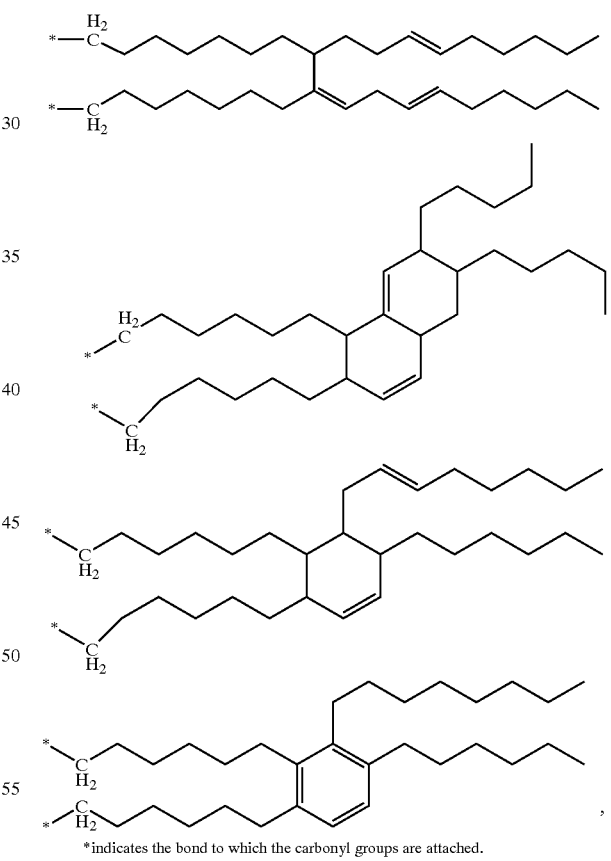

*indicates the bond to which the carbonyl groups are attached.

in a processing apparatus for thermoplastic polymers, to above the softening point/melting point of the thermoplastic polymer and allowing the components of the mixture to react with one another.

Suitable thermoplastic polymers are mentioned below.
1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EM and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

Homopolymers and copolymers from 1.)–4.) may have any stereostructure including syndiotactic, isotactic, hemi-isotactic or atactic; where atactic polymers are preferred. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polycarbonates and polyester carbonates.
20. Polyketones.
21. Polysulfones, polyether sulfones and polyether ketones.
22. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

The thermoplastic polymer is preferably selected from the group consisting of polyolefin, styrene block copolymer, polybutadiene, polyisoprene, EPDM (ethylene-propylene diene monomer) and EPR (ethylene-propylene elastomer).

Special preference is given to polyolefins, especially polyethylene and polypropylene in the various commercial forms.

A temperature of preferably from 160° C. to 280° C., especially from 180° C. to 260° C., and more especially from 190° C. to 250° C., is used.

The unsaturated carboxylic acid or unsaturated carboxylic acid derivative is preferably selected from the group consisting of an anhydride of an unsaturated dicarboxylic acid, an ester or diester of an unsaturated mono- or di-carboxylic acid and an amide of an unsaturated mono- or di-carboxylic acid.

The unsaturated carboxylic acid or unsaturated carboxylic acid derivative especially has from 3 to 40 carbon atoms.

Examples of suitable carboxylic acids and derivatives thereof include maleic acid, fumaric acid, acrylic acid, methacrylic acid, crotonic acid, isocrotonic acid, vinylacetic acid, oleic acid, elaidic acid, linoleic acid, linolenic acid, aconitic acid, itaconic acid and norbornene-dicarboxylic acid, and esters, amides and anhydrides thereof.

In addition to the acid derivatives mentioned above, other monomers may also be present, for example vinylsilanes, styrene or glycidyl acrylate.

Especially preferred unsaturated carboxylic acids or unsaturated carboxylic acid derivatives are maleic anhydride, maleic acid, fumaric acid, acrylic acid, methacrylic acid, crotonic acid, isocrotonic acid, vinylacetic acid, oleic acid, elaidic acid, linoleic acid, linolenic acid, aconitic acid, itaconic acid and norbornenedicarboxylic anhydride.

The unsaturated carboxylic acid or unsaturated carboxylic acid derivative is used in an amount of preferably from 0.5 to 20% by weight, especially from 1 to 10% by weight, based on the weight of the thermoplastic polymer.

As the hydroxylamine ester, there is preferably used a compound of formula (Ia) or (I'a)

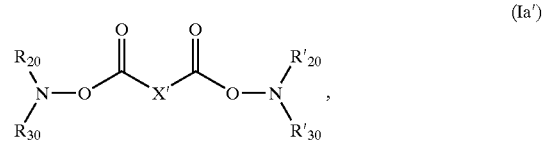

wherein

X is hydrogen, $C_1-C_{36}$alkyl, $C_1-C_{36}$alkyl which is substituted by halogen, $C_5-C_{12}$cycloalkyl, $C_7-C_{12}$bicyclo- or tricycloalkyl, $C_2-C_{36}$alkenyl, $C_2-C_{18}$alkynyl, $C_6-C_{10}$aryl, —O—$C_1-C_{18}$alkyl, —O—$C_6-C_{10}$aryl, —NH—$C_1-C_{18}$alkyl, —NH—$C_6-C_{10}$aryl, —N($C_1-C_6$alkyl)$_2$;

X' is a direct bond or $C_1-C_{36}$alkylene, $C_2-C_{36}$alkenylene, $C_2-C_{36}$alkynylene, phenylene, —($C_1-C_6$alkylene)-phenyl-($C_1-C_6$alkylene) or a group

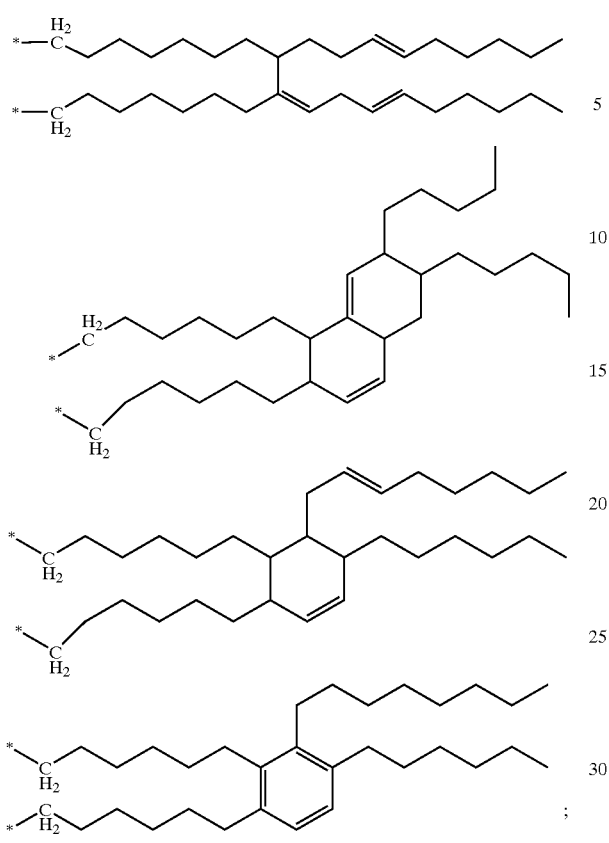

$R_{20}$, $R'_{20}$, $R_{30}$ and $R'_{30}$ are each independently of the others unsubstituted, halo-, CN—, $NO_2$— or —$COOR_{40}$-substituted or O— or $NR_{40}$-interrupted $C_1$–$C_{18}$alkyl, $C_2$–$C_{18}$alkenyl, $C_2$–$C_{18}$alkynyl;

$R_{40}$ is hydrogen, phenyl or $C_1$–$C_{18}$alkyl; or $R_{20}$ and $R_{30}$ and/or $R'_{20}$ and $R'_{30}$, together with the nitrogen atom to which they are bonded, form a 5- or 6-membered ring which may be interrupted by a nitrogen or oxygen atom and which may be substituted one or more times by $C_1$–$C_6$alkyl groups and carboxyl groups.

Preference is given to compounds of formula (I), especially those wherein $R_{20}$ and $R_{30}$, together with the nitrogen atom to which they are bonded, form a piperidine ring which is substituted in the 2,2- and 6,6-positions by $C_1$–$C_4$alkyl groups and in the 4-position has an ether, amine, amide, urethane, ester or ketal group. Special preference is given to cyclic ketals.

Compounds wherein the structural unit of formula (I) or (I') is one of the structural formulae A to S are especially suitable.

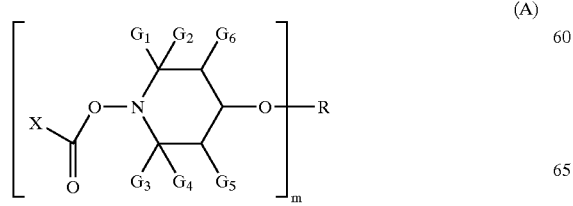

(A)

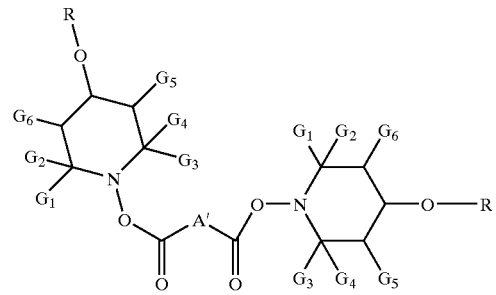

(A')

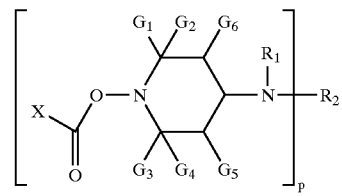

(B)

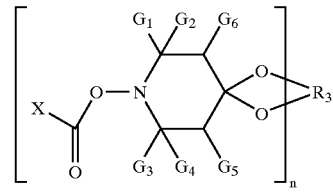

(C)

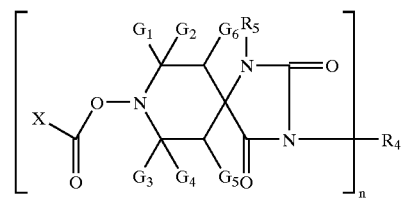

(D)

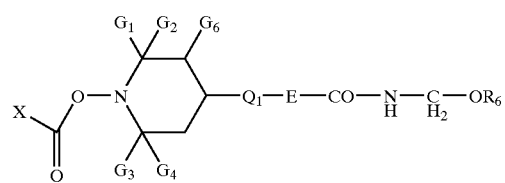

(E)

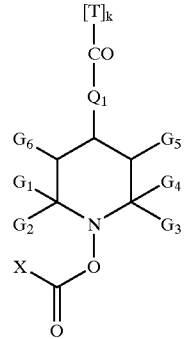

(F)

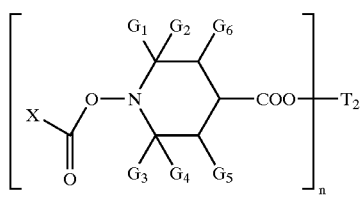
(G)
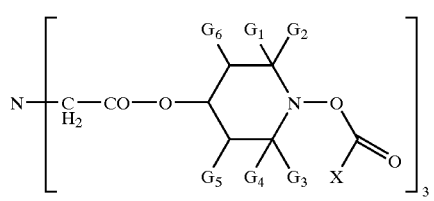
(H)
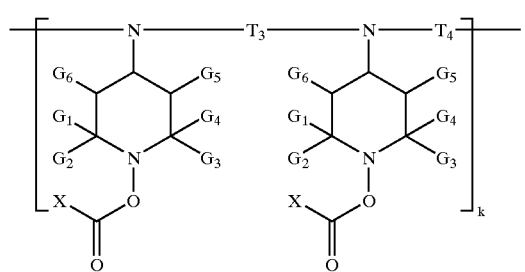
(I)
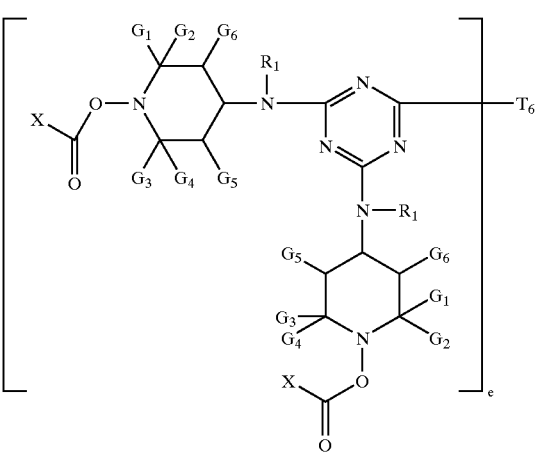
(K)
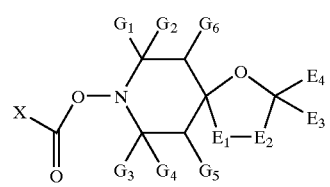
(L)
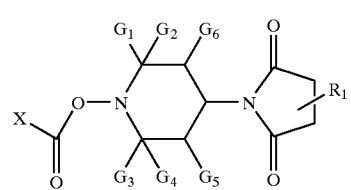
(M)
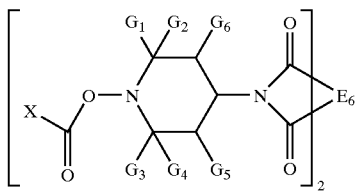
(N)
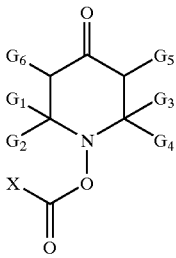
(O)
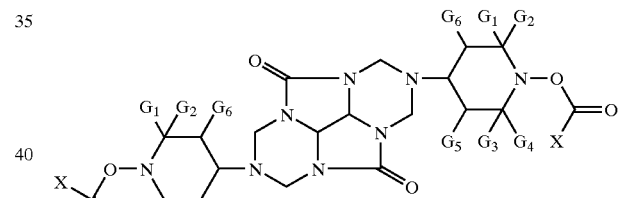
(P)
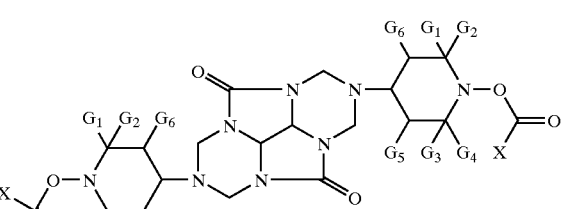
(Q)
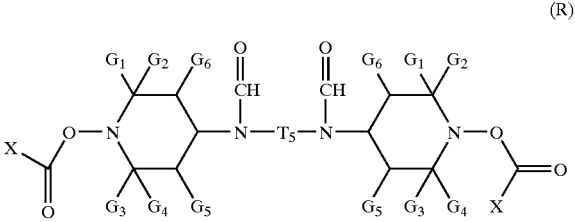
(R)
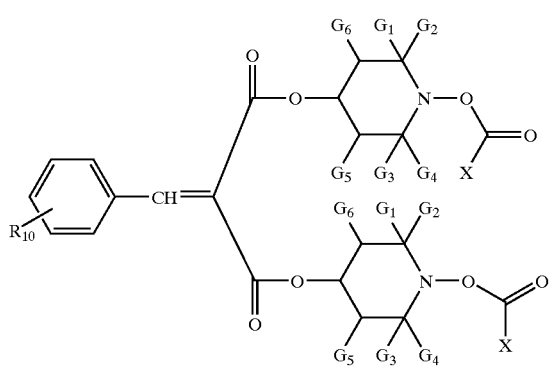
(S), wherein $G_1$, $G_2$, $G_3$ and $G_4$ are independently $C_1$–$C_4$alkyl, or $G_1$ and $G_2$ together and $G_3$ and $G_4$ together, or $G_1$ and $G_2$ together or $G_3$ and $G_4$ together are pentamethylene;

$G_5$ and $G_6$ are each independently of the other hydrogen or $C_1$–$C_4$alkyl; and X is hydrogen, $C_1$–$C_{18}$alkyl, $C_2$–$C_{18}$alkenyl, $C_2$–$C_{18}$alkynyl, $C_8$–$C_{10}$aryl, —O—$C_1$–$C_{18}$alkyl, —O—$C_6$-$C_{10}$aryl, —NH—$C_1$–$C_{18}$alkyl, —NH—$C_6$–$C_{10}$aryl, —N($C_1$–$C_6$alkyl)$_2$;

A' is a direct bond or $C_1$–$C_{36}$alkylene, $C_3$–$C_{36}$alkenylene, $C_3$–$C_{38}$alkynylene, phenylene, —($C_1$–$C_6$alkylene)-phenyl-($C_1$–$C_6$alkylene) or a group m is a number from 1–4;

R, when m is 1, is hydrogen, $C_1$–$C_{18}$alkyl that is uninterrupted or interrupted by one or more oxygen atoms, cyanoethyl, benzyl, glycidyl, a monovalent radical of an aliphatic carboxylic acid having from 2 to 18 carbon atoms, of a cycloaliphatic carboxylic acid having from 7 to 15 carbon atoms, of an α,β-unsaturated carboxylic acid having from 3 to 5 carbon atoms or of an aromatic carboxylic acid having from 7 to 15 carbon atoms, of a carbamic acid or phosphorus-containing acid, or is a monovalent silyl radical, it being possible for the carboxylic acid to be substituted in the aliphatic, cycloaliphatic or aromatic moiety, as the case may be, by from 1 to 3 groups —COO$Z_{12}$, wherein $Z_{12}$ is hydrogen, $C_1$–$C_{20}$alkyl, $C_3$–$C_{12}$alkenyl, $C_5$–$C_7$cycloalkyl, phenyl or benzyl;

R, when m is 2, is $C_2$–$C_{12}$alkylene, $C_4$–$C_{12}$alkenylene, xylylene, a bivalent radical of an aliphatic dicarboxylic acid having from 2 to 36 carbon atoms, of a cycloaliphatic or aromatic dicarboxylic acid having from 8 to 14 carbon atoms or of an aliphatic, cycloaliphatic or aromatic dicarbamic acid having from 8 to 14 carbon atoms, it being possible for the dicarboxylic acid to be substituted in the aliphatic, cycloaliphatic or aromatic moiety, as the case may be, by 1 or 2 groups —COO$Z_{12}$;

R, when m is 3, is a trivalent radical of an aliphatic, cycloaliphatic or aromatic tricarboxylic acid, which radical may be substituted in the aliphatic, cycloaliphatic or aromatic moiety by —COO$Z_{12}$, or is a trivalent radical of an aromatic tricarbamic acid or of a phosphorus-containing acid, or is a trivalent silyl radical;

R, when m is 4, is a tetravalent radical of an aliphatic, cycloaliphatic or aromatic tetracarboxylic acid;

p is 1, 2 or 3, $R_1$ is $C_1$–$C_{12}$alkyl, $C_5$–$C_7$cycloalkyl, $C_7$–$C_8$aralkyl, $C_2$–$C_{18}$alkanoyl, $C_3$–$C_5$ alkenoyl or benzoyl;

$R_2$, when p is 1, is unsubstituted or cyano-, carbonyl- or carbamide-substituted $C_1$–$C_{18}$alkyl, $C_5$–$C_7$cycloalkyl, $C_3$–$C_8$alkenyl, or is glycidyl, a group of formula —CH$_2$CH(OH)—Z or of formula —CO—Z or —CONH—Z, wherein Z is hydrogen, methyl or phenyl; or $R_2$, when p is 2, is $C_2$–$C_{12}$alkylene, $C_6$–$C_{12}$arylene, xylylene, a group —CH$_2$CH(OH)CH$_2$—O—B—O—CH$_2$CH(OH)CH$_2$— wherein B is $C_2$–$C_{10}$alkylene, $C_6$–$C_{15}$arylene or $C_6$–$C_{12}$cycloalkylene; or, when $R_1$ is not alkanoyl, alkenoyl or benzoyl, $R_2$ may also be a bivalent acyl radical of an aliphatic, cycloaliphatic or aromatic dicarboxylic acid or carbamic acid or is the group —CO—; or, when p is 1, $R_1$ and $R_2$ together may also be a cyclic acyl radical of an aliphatic or aromatic 1,2- or 1,3-dicarboxylic acid; or $R_2$ is a group wherein $T_7$ and $T_8$ are each independently of the other hydrogen or $C_1$–$C_{18}$alkyl, or $T_7$ and $T_8$ together are $C_4$–$C_6$alkylene or 3-oxapentamethylene;

$R_2$, when p is 3, is 2,4,6-triazinyl;

when n is 1, $R_3$ is $C_2$–$C_8$alkylene or $C_2$–$C_8$hydroxyalkylene or $C_4$–$C_{36}$acyloxyalkylene; or, when n is 2, $R_3$ is (—CH$_2$)$_2$C(CH$_2$—)$_2$;

when n is 1, $R_4$ is hydrogen, $C_1$–$C_{12}$alkyl, $C_3$–$C_5$alkenyl, $C_7$–$C_9$aralkyl, $C_5$–$C_7$cycloalkyl, $C_2$–$C_4$hydroxyalkyl, $C_2$–$C_6$alkoxyalkyl, $C_6$–$C_{10}$aryl, glycidyl, a group of formula —(CH$_2$)$_m$—COO—Q or of formula —(CH$_2$)$_m$—O—CO—Q wherein m is 1 or 2 and Q is $C_1$–$C_4$alkyl or phenyl; or, when n is 2, $R_4$ is $C_2$–$C_{12}$alkylene, $C_6$–$C_{12}$arylene, a group —CH$_2$CH(OH)CH$_2$—O—D—O—CH$_2$CH(OH)CH$_2$— wherein D is $C_2$–$C_{10}$alkylene, $C_6$–$C_{15}$arylene or $C_6$–$C_{12}$cycloalkylene, or a group —CH$_2$CH(O$Z_1$)CH$_2$—(OCH$_2$CH(O$Z_1$)CH$_2$)$_2$— wherein $Z_1$ is hydrogen, $C_1$–$C_{18}$alkyl, allyl, benzyl, $C_2$–$C_{12}$alkanoyl or benzoyl;

$R_5$ is hydrogen, $C_1$–$C_{12}$alkyl, allyl, benzyl, glycidyl or $C_2$–$C_6$alkoxyalkyl;

$Q_1$ is —N($R_7$)— or —O—;

E is $C_1$–$C_3$alkylene, the group —CH$_2$CH($R_8$)—O— wherein $R_8$ is hydrogen, methyl or phenyl, the group —(CH$_2$)$_3$—NH— or a direct bond;

$R_7$ is $C_1$–$C_{18}$alkyl, $C_5$–$C_7$cycloalkyl, $C_7$–$C_{12}$aralkyl, cyanoethyl, $C_8$–$C_{10}$aryl, the group —CH$_2$CH($R_8$)—OH; or a group of formula

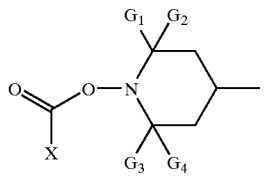

or a group of formula

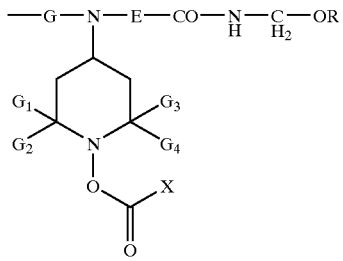

wherein G is $C_2$–$C_6$alkylene or $C_6$–$C_{12}$arylene and R is as defined hereinbefore; or $R_7$ is a group —E—CO—NH—CH$_2$—OR$_6$;

$R_6$ is hydrogen or $C_1$–$C_{18}$alkyl;

formula (F) is a structural repeating unit of an oligomer wherein T is ethylene or 1,2-propylene or a structural repeating unit which is derived from an α-olefin copolymer with an alkyl acrylate or methacrylate;

k is a number from 2 to 100;

$R_{10}$ is hydrogen, $C_1$–$C_{12}$alkyl or $C_1$–$C_{12}$alkoxy;

$T_2$ is as defined for $R_4$;

$T_3$ and $T_4$ are each independently of the other $C_2$–$C_{12}$alkylene, or $T_4$ is a group

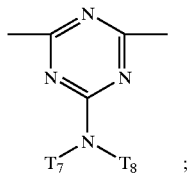

$T_5$ is $C_2$–$C_{22}$alkylene, $C_5$–$C_7$cycloalkylene, $C_1$–$C_4$-alkylenedi($C_5$–$C_7$-cycloalkylene), phenylene or phenylenedi($C_1$–$C_4$alkylene);

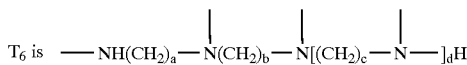

wherein a, b and c are each independently of the others 2 or 3, and d is 0 or 1;

e is 3 or 4;

$E_1$ and $E_2$ are oxo or imino.

$E_3$ is hydrogen, $C_1$–$C_{30}$alkyl, phenyl, naphthyl, it being possible for the phenyl or naphthyl to be substituted by chlorine or by $C_1$–$C_4$alkyl, or is $C_7$–$C_{12}$phenylalkyl or $C_1$–$C_4$alkyl-substituted $C_7$–$C_{12}$phenylalkyl;

$E_4$ is hydrogen, $C_1$–$C_{30}$alkyl, phenyl, naphthyl or $C_7$–$C_{12}$phenylalkyl; or $E_3$ and $E_4$ together are $C_4$–$C_{17}$polymethylene which may be substituted by up to 4 $C_1$–$C_4$alkyl groups; and $E_8$ is an aliphatic or aromatic tetravalent radical.

The radicals A' are derived from saturated or unsaturated aliphatic, aromatic or aliphatic/aromatic dicarboxylic acids. Examples of such acids are given hereinbelow. The radicals that are derived from aliphatic $C_2$–$C_{18}$dicarboxylic acids or from dimeric acids mentioned hereinbelow are especially suitable.

Any substituents that are $C_1$–$C_{12}$alkyl are, for example, methyl, ethyl, n-propyl, n-butyl, sec-butyl, tert-butyl, n-hexyl, n-octyl, 2-ethyl-hexyl, n-nonyl, n-decyl, n-undecyl or n-dodecyl. $C_1$–$C_{18}$Alkyl as a meaning of R may be, for example, the groups mentioned above and also, in addition, for example, n-tridecyl, n-tetradecyl, n-hexadecyl and n-octadecyl.

When R is $C_3$–$C_8$alkenyl, it may be, for example, 1-propenyl, allyl, methallyl, 2-butenyl, 2-pentenyl, 2-hexenyl, 2-octenyl or 4-tert-butyl-2-butenyl.

$C_5$–$C_7$Cycloalkyl is for example, cyclopentyl, cyclohexyl or cycloheptyl.

When R is a monovalent radical of a carboxylic acid, R is, for example, an acetic acid, caproic acid, stearic acid, acrylic acid, methacrylic acid, benzoic acid or β-(3,5-di-tert-butyl-4-hydroxy-phenyl)-propionic acid radical.

When R is a monovalent silyl radical, $Z_{12}$ is, for example, a radical of formula —(C$_j$H$_{2j}$)—Si(Z')$_2$Z" wherein j is an integer from the range 2 to 5 and Z' and Z" are each independently of the other $C_1$–$C_4$alkyl or $C_1$–$C_4$alkoxy.

When R is a bivalent radical of a dicarboxylic acid, R is, for example, a malonic acid, succinic acid, glutaric acid, adipic acid, suberic acid, sebacic acid, maleic acid, itaconic acid, phthalic acid, dibutylmalonic acid, dibenzylmalonic acid, butyl-(3,5-di-tert-butyl-4-hydroxybenzyl)-malonic acid or bicycloheptenedicarboxylic acid radical.

Further suitable dicarboxylic acids having up to 36 carbon atoms are the following dimeric acids or mixtures thereof

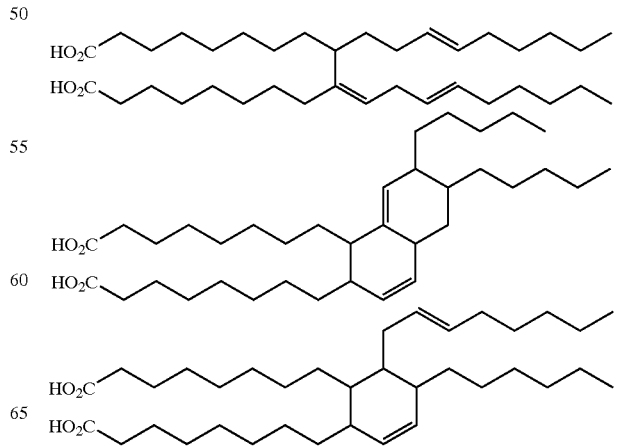

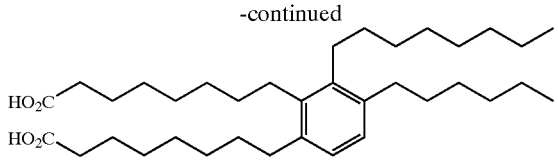

When R is a trivalent radical of a tricarboxylic acid, R is, for example, a trimellitic acid, citric acid or nitrilotriacetic acid radical.

When R is a tetravalent radical of a tetracarboxylic acid, R is, for example, the tetravalent radical of butane-1,2,3,4-tetracarboxylic acid or of pyromellitic acid.

When R is a bivalent radical of a dicarbamic acid, R is, for example, a hexamethylene-dicarbamic acid or 2,4-toluylene-dicarbamic acid radical.

$C_7$–$C_8$Aralkyl is, especially, phenethyl and, more especially, benzyl.

$C_1$–$C_8$Alkanoyl is, for example, formyl, propionyl, butyryl, octanoyl, but preferably acetyl and, as $C_3$–$C_5$alkenoyl, especially acryloyl.

Any substituents that are $C_1$–$C_{12}$- or $C_1$–$C_{18}$-alkyl are as defined hereinbefore.

Any substituents that are $C_5$–$C_7$cycloalkyl are, especially, cyclohexyl.

$C_2$–$C_5$Hydroxyalkyl is, especially, 2-hydroxyethyl or 2-hydroxypropyl.

$C_2$–$C_8$Alkenyl is, for example, allyl, methallyl, 2-butenyl, 2-pentenyl, 2-hexenyl or 2-octenyl.

$C_1$–$C_4$Alkyl substituted by a hydroxy, cyano, alkoxycarbonyl or carbamide group may be, for example, 2-hydroxyethyl, 2-hydroxypropyl, 2-cyanoethyl, methoxycarbonylmethyl, 2-ethoxy-carbonylethyl, 2-aminocarbonylpropyl or 2-(dimethylaminocarbonyl)-ethyl.

Any substituents that are $C_2$–$C_{12}$alkylene are, for example, ethylene, propylene, 2,2-dimethylpropylene, tetramethylene, hexamethylene, octamethylene, decamethylene or dodecamethylene.

Any substituents that are aryl are for example phenyl or naphthyl.

Any substituents that are $C_6$–$C_{15}$arylene are, for example, o-, m- or p-phenylene, 1,4-naphthylene or 4,4'-diphenylene.

As $C_6$–$C_{12}$cycloalkylene special mention should be made of cyclohexylene.

$C_4$–$C_{36}$Acyloxyalkylene is, for example, 2-ethyl-2-acetoxymethylpropylene. $R_3$ is especially a group of the formula

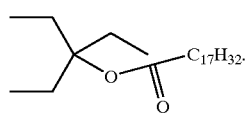

Any substituents that are $C_2$–$C_6$alkoxyalkyl are, for example, methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

Halogen is F, Cl, Br and I. Alkyl substituted by halogen is for example trifluormethyl.

A preferred sub-group is formed by the hydroxylamine esters of formulae A, A', B, C, O, P, Q, R and S

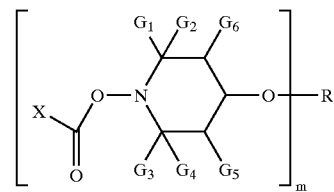
(A)

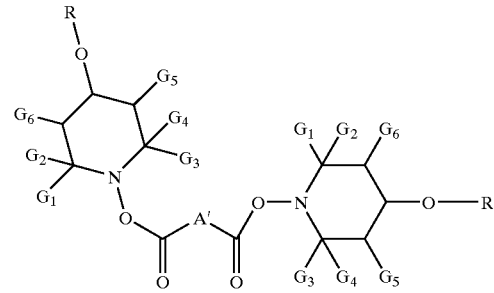
(A')

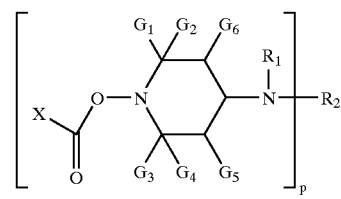
(B)

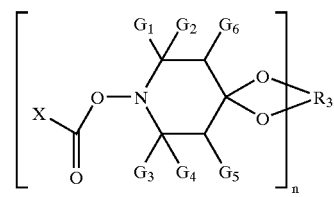
(C)

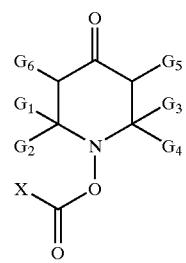
(O)

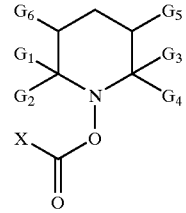
(P)

-continued (Q)
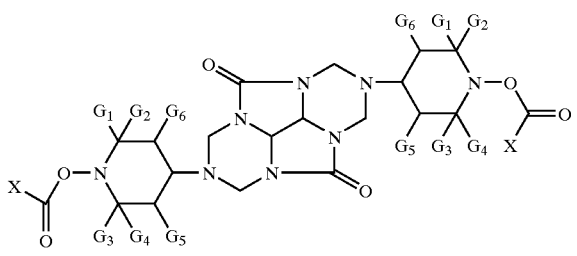

(R)
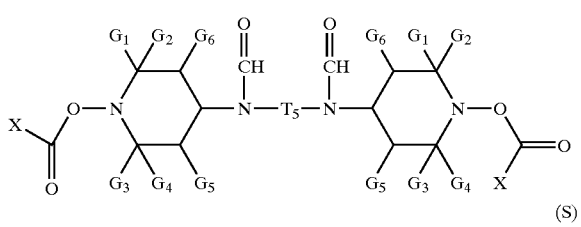

(S)
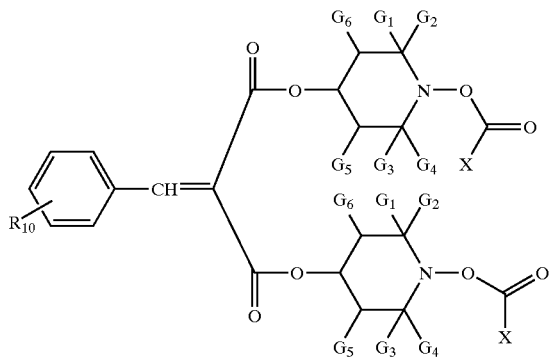

wherein $G_1$, $G_2$, $G_3$ and $G_4$ are each independently of the others alkyl having from 1 to 4 carbon atoms, or $G_1$ and $G_2$ together and $G_3$ and $G_4$ together, or $G_1$ and $G_2$ together or $G_3$ and $G_4$ together are pentamethylene;

$G_5$ and $G_6$ are each independently of the other hydrogen or $C_1$–$C_4$alkyl;

m is a number 1–4;

R, when m is 1, is hydrogen, uninterrupted $C_1$–$C_{18}$alkyl or $C_2$–$C_{18}$alkyl interrupted by one or more oxygen atoms, or is cyanoethyl, benzoyl, glycidyl, a monovalent radical of an aliphatic carboxylic acid having from 2 to 18 carbon atoms, of a cycloaliphatic carboxylic acid having from 7 to 15 carbon atoms or of an α,β-unsaturated carboxylic acid having from 3 to 5 carbon atoms or of an aromatic carboxylic acid having from 7 to 15 carbon atoms, it being possible for each carboxylic acid to be substituted in the aliphatic, cycloaliphatic or aromatic unit by from 1 to 3 groups —$COOZ_{12}$ wherein $Z_{12}$ is hydrogen, $C_1$–$C_{18}$alkyl, $C_3$–$C_{12}$alkenyl, $C_5$–$C_7$cycloalkyl, phenyl or benzyl; or R is a monovalent radical of a carbamic acid or phosphorus-containing acid or is a monovalent silyl radical;

R, when m is 2, is $C_2$–$C_{12}$alkylene, $C_4$–$C_{12}$alkenylene, xylylene, a bivalent radical of an aliphatic dicarboxylic acid having from 2 to 36 carbon atoms, or of a cycloaliphatic or aromatic dicarboxylic acid having from 8 to 14 carbon atoms or of an aliphatic, cycloaliphatic or aromatic dicarbamic acid having from 8 to 14 carbon atoms, it being possible for each dicarboxylic acid to be substituted in the aliphatic, cycloaliphatic or aromatic unit by one or two groups —$COOZ_{12}$; or R is a bivalent radical of a phosphorus-containing acid or is a bivalent silyl radical;

R, when m is 3, is a trivalent radical of an aliphatic, cycloaliphatic or aromatic tricarboxylic acid which may be substituted in the aliphatic, cycloaliphatic or aromatic unit by —$COOZ_{12}$, or is a trivalent radical of an aromatic tricarbamic acid or of a phosphorus-containing acid, or is a trivalent silyl radical;

R, when m is 4, is a tetravalent radical of an aliphatic, cycloaliphatic or aromatic tetracarboxylic acid;

p is 1, 2 or 3, $R_1$ is $C_1$–$C_{12}$alkyl, $C_5$–$C_7$cycloalkyl, $C_7$–$C_8$aralkyl, $C_2$–$C_{18}$alkanoyl, $C_3$–$C_5$alkenoyl or benzoyl;

when p is 1, $R_2$ is $C_1$–$C_{18}$alkyl, $C_5$–$C_7$cycloalkyl, $C_3$–$C_8$alkenyl, each unsubstituted or substituted by a cyano, carbonyl or carbamide group, or is glycidyl, a group of formula —$CH_2CH(OH)$—Z or of formula —CO—Z or —CONH—Z, wherein Z is hydrogen, methyl or phenyl; or, when p is 2, $R_2$ is $C_2$–$C_{12}$alkylene, $C_6$–$C_{12}$arylene, xylylene, a group —$CH_2CH(OH)CH_2$—O—B—O—$CH_2CH(OH)CH_2$—, wherein B is $C_2$–$C_{10}$alkylene, $C_6$–$C_{15}$arylene or $C_6$–$C_{12}$cycloalkylene; or, with the proviso that $R_1$ is not alkanoyl, alkenoyl or benzoyl, $R_2$ may also be a bivalent acyl radical of an aliphatic, cycloaliphatic or aromatic dicarboxylic acid or dicarbamic acid, or may be the group —CO—; or, when p is 1, $R_1$ and $R_2$ together may be the cyclic acyl radical of an aliphatic or aromatic 1,2- or 1,3-dicarboxylic acid; or $R_2$ is a group

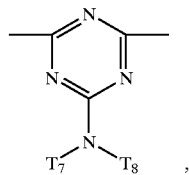

wherein $T_7$ and $T_8$ are each independently of the other hydrogen, alkyl having from 1 to 18 carbon atoms, or $T_7$ and $T_8$ together are alkylene having from 4 to 6 carbon atoms or 3-oxapentamethylene;

when p is 3, $R_2$ is 2,4,6-triazinyl;

n is a number 1 or 2;

when n is 1, $R_3$ is $C_2$–$C_8$alkylene or hydroxyalkylene or $C_4$–$C_{36}$acyloxyalkylene, especially a group of formula;

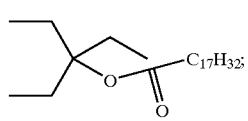

or, when n is 2, $R_3$ is (—$CH_2$)$_2$C(—$CH_2$—)$_2$;

$R_{10}$ is hydrogen, $C_1$–$C_{12}$alkyl or $C_1$–$C_{12}$alkoxy;

$T_5$ is $C_2$–$C_{22}$alkylene, $C_5$–$C_7$cycloalkylene, $C_1$–$C_4$alkylenedi($C_5$–$C_7$cycloalkylene), phenylene or phenylenedi($C_1$–$C_4$alkylene);

X is hydrogen, $C_1$–$C_{18}$alkyl, $C_2$–$C_{18}$alkenyl, $C_2$–$C_{18}$alkynyl, $C_8$–$C_{10}$aryl, —O—$C_1$–$C_{18}$alkyl, —O—$C_6$–$C_{10}$aryl, —NH—$C_1$–$C_{18}$alkyl, —NH—$C_6$–$C_{10}$aryl, —N($C_1$–$C_6$alkyl)$_2$;

A' is $C_1$–$C_{36}$alkylene, $C_3$–$C_{36}$alkenylene or $C_3$–$C_{36}$alkynylene.

Special preference is given to hydroxylamine esters of formulae A, B, C and O.

Among the compounds of formulae A, B, C and O preference is given to those wherein $G_1$, $G_2$, $G_3$ and $G_4$ are each independently of the others alkyl having from 1 to 4 carbon atoms;

$G_5$ and $G_6$ are each independently of the other hydrogen or $C_1$–$C_4$alkyl;

m is a number 1–2;

R, when m is 1, is hydrogen, uninterrupted $C_1$–$C_{18}$alkyl or $C_2$–$C_{18}$alkyl interrupted by one or more oxygen atoms, or is cyanoethyl, benzoyl, glycidyl, a monovalent radical of an aliphatic carboxylic acid having from 2 to 18 carbon atoms, of a cycloaliphatic carboxylic acid having from 7 to 15 carbon atoms or of an α,β-unsaturated carboxylic acid having from 3 to 5 carbon atoms or of an aromatic carboxylic acid containing from 7 to 15 carbon atoms, it being possible for each carboxylic acid to be substituted in the aliphatic, cycloaliphatic or aromatic unit by from 1 to 3 groups —COO$Z_{12}$ wherein $Z_{12}$ is hydrogen, $C_1$–$C_{20}$alkyl, $C_3$–$C_{12}$alkenyl, $C_5$–$C_7$cycloalkyl, phenyl or benzyl; or R is a monovalent radical of a carbamic acid or phosphorus-containing acid or is a monovalent silyl radical;

R, when m is 2, is $C_2$–$C_{12}$alkylene, $C_4$–$C_{12}$alkenylene, xylylene, a bivalent radical of an aliphatic dicarboxylic acid having from 2 to 36 carbon atoms or of a cycloaliphatic or aromatic dicarboxylic acid having from 8 to 14 carbon atoms or of an aliphatic, cycloaliphatic or aromatic dicarbamic acid having from 8 to 14 carbon atoms, it being possible for each dicarboxylic acid to be substituted in the aliphatic, cycloaliphatic or aromatic unit by one or two groups —COO$Z_{12}$; or R is a bivalent radical of a phosphorus-containing acid or a bivalent silyl radical;

p is 1, $R_1$ is $C_1$–$C_{12}$alkyl, $C_5$–$C_7$cycloalkyl, $C_7$–$C_8$aralkyl, $C_2$–$C_{18}$alkanoyl, $C_3$–$C_5$alkenoyl or benzoyl;

$R_2$ is $C_1$–$C_{18}$alkyl, $C_5$–$C_7$cycloalkyl, $C_2$–$C_8$alkenyl, each unsubstituted or substituted by a cyano, carbonyl or carbamide group, or is glycidyl, a group of formula —CH$_2$CH(OH)—Z or of formula —CO—Z or —CONH—Z, wherein Z is hydrogen, methyl or phenyl;

n is a number 1 or 2;

when n is 1, $R_3$ is $C_2$–$C_8$alkylene or hydroxyalkylene or $C_4$–$C_{36}$acyloxyalkylene, especially a group of formula

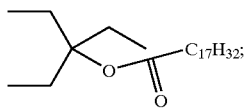

or, when n is 2, $R_3$ is (—CH$_2$)$_2$C(CH$_2$—)$_2$.

A likewise preferred group consists of hydroxylamines wherein $G_1$ and $G_2$ are ethyl and $G_3$ and $G_4$ are methyl, or $G_1$ and $G_3$ are ethyl and $G_2$ and $G_4$ are methyl; and $G_5$ and $G_6$ are each independently of the other hydrogen or methyl.

The other substituents have the definitions, including the preferred meanings, given above.

The substituent X is especially selected from the group consisting of $C_1$–$C_{36}$alkyl, $C_2$–$C_{19}$alkenyl and $C_6$–$C_{10}$aryl.

Further suitable hydroxylamines are oligomers or polymers that are obtained by reacting a dicarboxylic acid with a compound of formula A1 or B1 or by reacting a diisocyanate with a compound of formula A1,

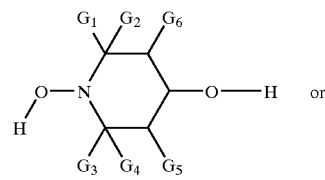

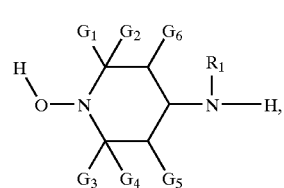

wherein the radicals $G_1$, $G_2$, $G_3$, $G_4$, $G_5$, $G_6$ and $R_1$ have the definitions, including the preferred meanings, given above.

The compounds of formula A1 may be reacted to form polyesters. The polyesters may be homo- or co-polyesters that are derived from aliphatic, cycloaliphatic or aromatic dicarboxylic acids and diols and a compound of formula A1.

The aliphatic dicarboxylic acids may contain from 2 to 40 carbon atoms, the cycloaliphatic dicarboxylic acids from 6 to 10 carbon atoms, the aromatic dicarboxylic acids from 8 to 14 carbon atoms, the aliphatic hydroxycarboxylic acids from 2 to 12 carbon atoms and the aromatic and cycloaliphatic hydroxycarboxylic acids from 7 to 14 carbon atoms.

It is also possible for the polyesters, in small amounts, for example from 0.1 to 3 mol %, based on the dicarboxylic acids present, to be branched by means of more than difunctional monomers (for example, pentaerythritol, trimellitic acid, 1,3,5-tri(hydroxyphenyl)benzene, 2,4-dihydroxybenzoic acid or 2-(4-hydroxyphenyl)-2-(2,4-dihydroxyphenyl)propane).

Suitable dicarboxylic acids are linear and branched saturated aliphatic dicarboxylic acids, aromatic dicarboxylic acids and cycloaliphatic dicarboxylic acids.

Suitable aliphatic dicarboxylic acids are those having from 2 to 40 carbon atoms, for example oxalic acid, malonic acid, dimethylmalonic acid, succinic acid, pimelic acid, adipic acid, trimethyladipic acid, sebacic acid, azelaic acid and dimeric acids (dimerisation products of unsaturated aliphatic carboxylic acids such as oleic acid), alkylated malonic and succinic acids such as octadecylsuccinic acid.

Suitable cycloaliphatic dicarboxylic acids are: 1,3-cyclobutanedicarboxylic acid, 1,3-cyclopentanedicarboxylic acid, 1,3- and 1,4-cyclohexanedicarboxylic acid, 1,3- and 1,4-(dicarboxylmethyl)cyclohexane and 4,4'-dicyclohexyldicarboxylic acid.

Suitable aromatic dicarboxylic acids are: especially terephthalic acid, isophthalic acid, o-phthalic acid, and 1,3-, 1,4-, 2,6- or 2,7-naphthalenedicarboxylic acid, 4,4'-diphenyl-dicarboxylic acid, 4,4'-diphenylsulfonedicarboxylic acid, 4,4'-benzophenonedicarboxylic acid, 1,1,3-trimethyl-5-carboxyl-3-(p-carboxylphenyl)-indan, 4,4'-diphenyl ether dicarboxylic acid, bis-p-(carboxylphenyl)-methane or bis-p-(carboxylphenyl)-ethane.

Preference is given to the aromatic dicarboxylic acids and, amongst those, especially terephthalic acid, isophthalic acid and 2,6-naphthalenedicarboxylic acid Further suitable dicarboxylic acids are those that contain —CO—NH— groups; they are described in DE-A 2 414

349. Dicarboxylic acids that contain N-heterocyclic rings are also suitable, for example those that are derived from carboxylalkylated, carboxylphenylated or carboxybenzylated monoamine-s-triazinedicarboxylic acids (cf. DE-A 2 121 184 and 2 533 675), mono- or bis-hydantoins, optionally halogenated benzimidazoles or parabanic acid. The carboxyalkyl groups therein may contain from 3 to 20 carbon atoms.

When additional diols are used, suitable aliphatic diols are the linear and branched aliphatic glycols, especially those having from 2 to 12, more especially from 2 to 6, carbon atoms in the molecule, for example: ethylene glycol, 1,2- and 1,3-propylene glycol, 1,2-, 1,3-, 2,3- or 1,4-butanediol, pentyl glycol, neopentyl glycol, 1,6-hexanediol and 1,12-dodecanediol. A suitable cycloaliphatic diol is, for example, 1,4-dihydroxycyclohexane. Further suitable aliphatic diols are, for example, 1,4-bis(hydroxymethyl)cyclohexane, aromatic-aliphatic diols such as p-xylylene glycol or 2,5-dichloro-p-xylylene glycol, 2,2-(β-hydroxyethoxyphenyl)-propane and also polyoxyalkylene glycols such as diethylene glycol, triethylene glycol, polyethylene glycol and polypropylene glycol. The alkylene diols are preferably linear and contain especially from 2 to 4 carbon atoms.

Polyoxyalkylene glycols having molecular weights of from 150 to 40 000 are also suitable.

As aromatic diols mention is made of those wherein two hydroxy groups are bonded to one or to different aromatic hydrocarbon radical(s).

Preferred diols are the alkylene diols, and 1,4-dihydroxycyclohexane and 1,4-bis(hydroxy-methyl)cyclohexane. Special preference is given to ethylene glycol, 1,4-butanediol, and also 1,2- and 1,3-propylene glycol.

Further suitable aliphatic diols are the β-hydroxyalkylated, especially β-hydroxyethylated, bisphenols such as 2,2-bis[4'-((β-hydroxyethoxy)phenyl]propane. Further bisphenols are mentioned hereinafter.

A further group of suitable aliphatic diols comprises the heterocyclic diols described in German Offenlegungsschriften 1 812 003, 2 342 432, 2 342 372 and 2 453 326. Examples are: N,N'-bis(β-hydroxyethyl)-5,5-dimethylhydantoin, N,N'-bis(β-hydroxypropyl)-5,5-dimethylhydantoin, methylenebis[N-(β-hydroxyethyl)-5-methyl-5-ethylhydantoin], methylenebis[N-(β-hydroxyethyl)-5,5-dimethylhydantoin], N,N'-bis(β-hydroxyethyl)benzimidazolone, N,N'-bis(β-hydroxyethyl)-(tetrachloro)-benzimidazolone and N,N'-bis(β-hydroxyethyl)-(tetrabromo)-benzimidazolone.

Suitable aromatic diols include mononuclear diphenols and, especially, binuclear diphenols carrying a hydroxyl group on each aromatic nucleus. "Aromatic" is understood to refer preferably to hydrocarbon-aromatic radicals, for example phenylene or naphthylene. Besides, for example, hydroquinone, resorcinol and 1,5-, 2,6- and 2,7-dihydroxynaphthalene, special mention should be made of bisphenols that can be represented by the following formulae:

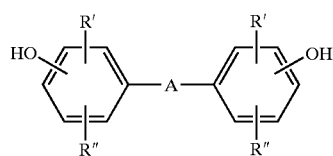

-continued

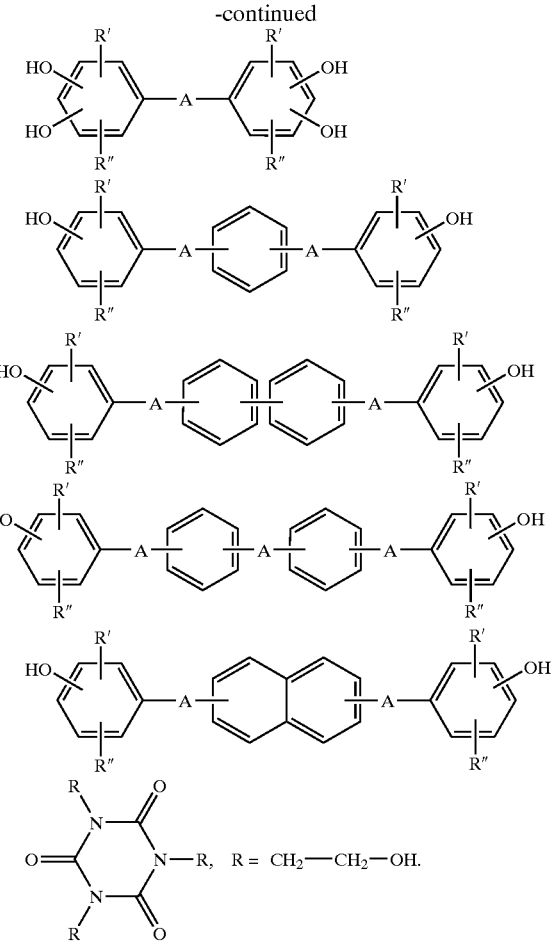

The hydroxyl groups may be in the m-position, but especially in the p-position; R' and R" in those formulae may be alkyl having from 1 to 6 carbon atoms, halogen such as chlorine or bromine, and especially hydrogen atoms. A can denote a direct bond or —O—, —S—, —(O)S(O)—, —C(O)—, —P(O)(C$_1$–C$_{20}$alkyl)-, unsubstituted or substituted alkylidene, cycloalkylidene or alkylene.

Examples of unsubstituted or substituted alkylidene are: ethylidene, 1,1- or 2,2-propylidene, 2,2-butylidene, 1,1-isobutylidene, pentylidene, hexylidene, heptylidene, octylidene, dichloroethylidene and trichloroethylidene.

Examples of unsubstituted or substituted alkylene are methylene, ethylene, phenylmethylene, diphenylmethylene and methylphenylmethylene. Examples of cycloalkylidene are cyclopentylidene, cyclohexylidene, cycloheptylidene and cyclooctylidene.

Examples of bisphenols are: bis(p-hydroxyphenyl) ether or thioether, bis(p-hydroxyphenyl)-sulfone, bis(p-hydroxyphenyl)methane, bis(4-hydroxyphenyl)-2,2'-biphenyl, phenylhydroquinone, 1,2-bis(p-hydroxyphenyl)ethane, 1-phenyl-bis(p-hydroxyphenyl)methane, diphenyl-bis(p-hydroxyphenyl)methane, diphenyl-bis(p-hydroxyphenyl)ethane, bis(3,5-dimethyl-4-hydroxyphenyl)sulfone, bis(3,5-dimethy-4-hydroxyphenyl)-p-diisopropylbenzene, bis(3,5-dimethyl-4-hydroxyphenyl)-m-diisopropylbenzene, 2,2-bis(3',5'-dimethyl-4'-hydroxyphenyl)propane, 1,1- or 2,2-bis(p-hydroxyphenyl) butane, 2,2-bis(p-hydroxyphenyl)hexafluoropropane, 1,1-dichloro- or 1,1,1-trichloro-2,2-bis(p-hydroxyphenyl) ethane, 1,1-bis(p-hydroxyphenyl)cyclopentane and especially 2,2-bis(p-hydroxyphenyl)propane (bisphenol A) and 1,1-bis(p-hydroxyphenyl)cyclohexane (bisphenol C).

Suitable polyesters of hydroxycarboxylic acids are, for example, polycaprolactone, polypivalolactone and the polyesters of 4-hydroxycyclohexanecarboxylic acid, 2-hydroxy-6-naphthalenecarboxylic acid or 4-hydroxybenzoic acid.

Furthermore, polymers that may contain mainly ester bonds, but also other bonds, for example polyester amides and polyester imides, are also suitable.

Oligomers/polymers are obtained which contain, as structural repeating unit, a group of formula A2

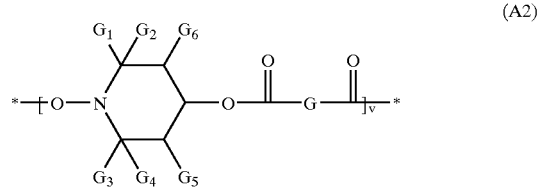

(A2)

wherein the substituents $G_1$–$G_6$ are as defined hereinbefore, v is a number 2–200 and the meaning of G results from the dicarboxylic acid used. Suitable dicarboxylic acids are mentioned hereinbefore.

When a compound of formula B1 is reacted with the described dicarboxylic acids and, optionally, further diols, polyester amides are obtained having the structural repeating unit (B2)

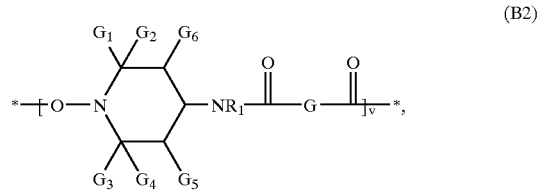

(B2)

The definitions of the substituents are given hereinbefore.

A third group of very suitable oligomers/polymers comprises polyurethanes that are obtained by reacting diisocyanates with compounds of formula A1 and, optionally, further diols.

Very suitable diisocyanates are 1,6-bis[isocyanato]hexane, 5-isocyanato-3-(isocyanatomethyl)-1,1,3-trimethylcyclohexane, 1,3-bis[5-isocyanato-1,3,3-trimethylphenyl]-2,4-dioxo-1,3-diazetidine, 3,6-bis[9-isocyanatononyl]-4,5-di(1-heptenyl)cyclohexene, bis[4-isocyanatocyclohexyl]methane, trans-1,4-bis[isocyanato]cyclohexane, 1,3-bis[isocyanatomethyl]-benzene, 1,3-bis[1-isocyanato-1-methyl-ethyl]benzene, 1,4-bis[2-isocyanato-ethyl]cyclohexane, 1,3-bis[isocyanatomethyl]cyclohexane, 1,4-bis[1-isocyanato-1-methylethyl]benzene, bis[isocyanato]isododecylbenzene,1,4-bis[isocyanato]benzene, 2,4-bis[isocyanato]toluene, 2,6-bis[isocyanatoltoluene, 2,4-/2,6-bis[isocyanato]toluene, 2-ethyl-1,2,3-tris[3-isocyanato-4-methyl-anilinocarbonyloxy]propane, N,N'-bis[3-isocyanato-4-methylphenyl]urea, 1,4-bis[3-isocyanato-4-methylphenyl]-2,4-dioxo-1,3-diazetidine, 1,3,5-tris[3-isocyanato-4-methylphenyl]-2,4,6-trioxohexahydro-1,3,5-triazine, 1,3-bis[3-isocyanato-4-methylphenyl]-2,4,5-trioxoimidazolidine, bis[2-isocyanatophenyl]methane, (2-isocyanato-phenyl)-(4-isocyanatophenyl)-methane, bis[4-isocyanato-phenyl]methane, 2,4-bis-[4-isocyanatobenzyl]-1-isocyanatobenzene, [4-isocyanato-3-(4-isocyanato-benzyl)-phenyl]-[2-isocyanato-5-(4-isocyanato-benzyl)-phenyl]methane, tris[4-isocyanato-phenyl]methane, 1,5-bis[isocyanato]-naphthalene and 4,4'-bisfisocyanato]-3,3'-dimethyl-biphenyl.

Especially preferred diisocyanates are 1,6-bis[isocyanato]hexane, 5-isocyanato-3-(isocyanatomethyl)-1,1,3-trimethylcyclohexane, 2,4-bis[isocyanato]toluene, 2,6-bis[isocyanato]-toluene, 2,4-/2,6-bis[isocyanato]toluene or bis[4-isocyanato-phenyl]methane.

Polyurethanes having the structural repeating unit (A3)

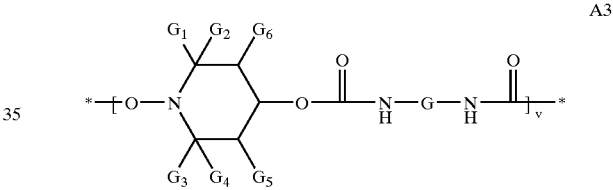

A3 are obtained. The substituents are defined hereinbefore. The meaning of G results from the diisocyanates used.

The hydroxylamine ester is used in an amount of preferably from 0.01 to 5% by weight, especially from 0.1 to 2% by weight, based on the weight of the thermoplastic polymer used.

Especially suitable individual compounds are mentioned hereinbelow.

TABLE 1

| Compound no. | Structural formula |
|---|---|
| 101 |  |

TABLE 1-continued
| Compound no. | Structural formula |
|---|---|
| 102 | 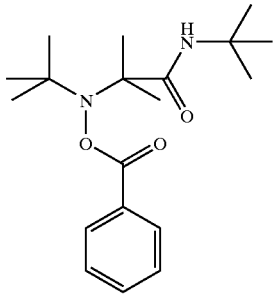 |
| 103 | 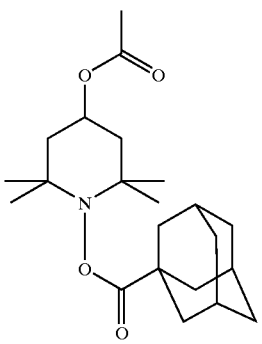 |
| 104 | 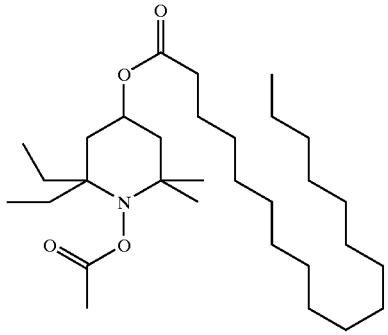 |
| 105 | 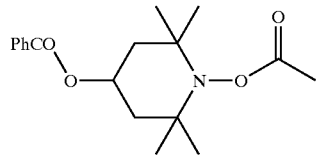 |
| 106 | 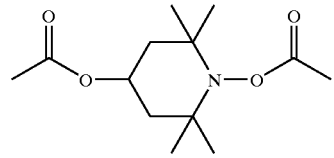 |
| 107 | 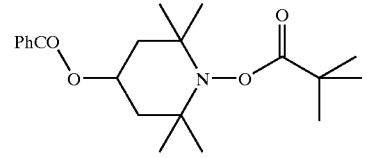 |

TABLE 1-continued

| Compound no. | Structural formula |
| --- | --- |
| 108 | |
| 109 | |
| 110 | |
| 111 | |
| 112 | |
| 113 | |

TABLE 1-continued
| Compound no. | Structural formula |
|---|---|
| 114 | 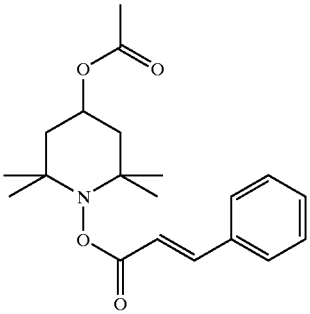 |
| 115 | 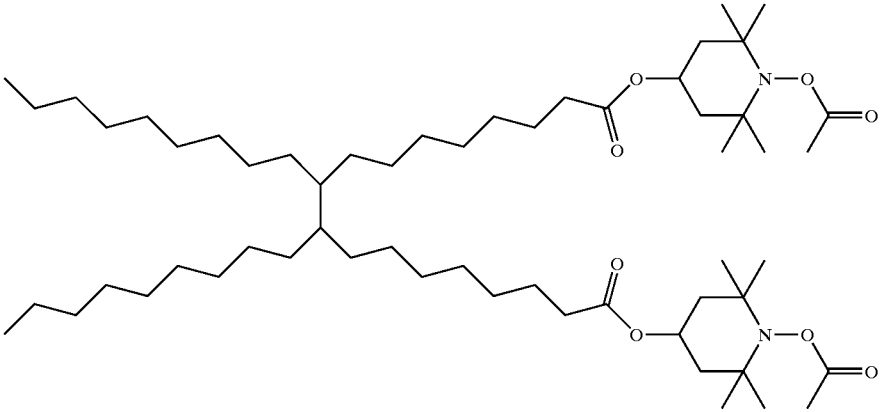 |
| 116 | 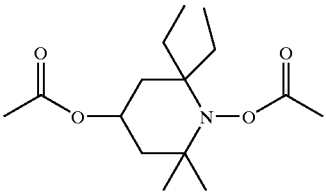 |
| 117 | 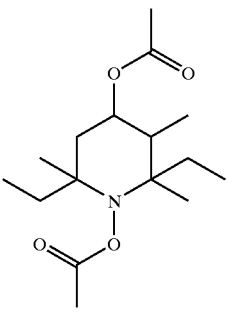 |

TABLE 1-continued

| Compound no. | Structural formula |
|---|---|
| 118 | (structure) |
| 119 | (structure) |
| 120 | (structure) |
| 121 | (structure) |
| 122 | (structure) |
| 123 | (structure) |

TABLE 1-continued

| Compound no. | Structural formula |
|---|---|
| 124 | |
| 125 | |
| 126 | |
| 127 | |
| 128 | |
| 129 | |

TABLE 1-continued

| Compound no. | Structural formula |
|---|---|
| 130 | |
| 131 | |
| 132 | |
| 133 | |
| 134 | |

TABLE 1-continued

| Compound no. | Structural formula |
|---|---|
| 135 | |
| 136 | |
| 137 | |
| 138 | |

TABLE 1-continued

| Compound no. | Structural formula |
| --- | --- |
| 139 | |
| 140 | |
| 141 | |
| 142 | |

TABLE 1-continued
| Compound no. | Structural formula |
|---|---|
| 143 | 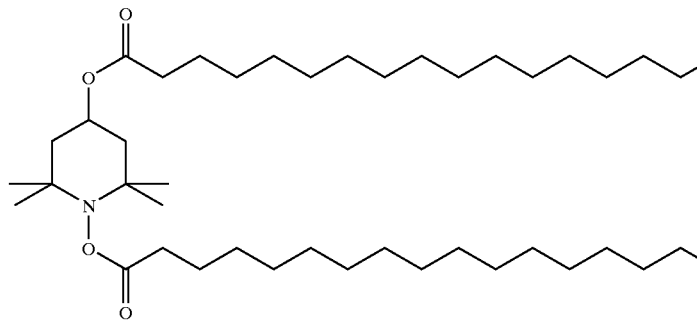 |
| 144 | 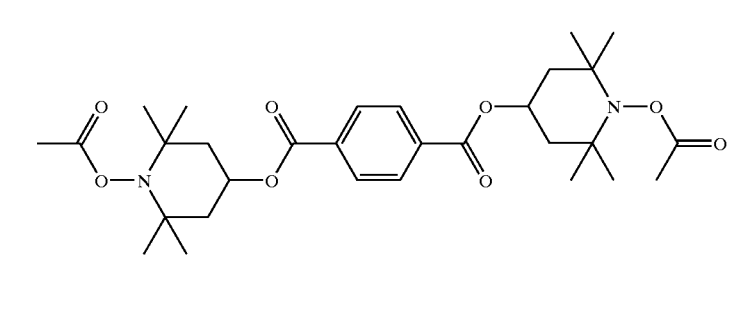 |
| 145 | 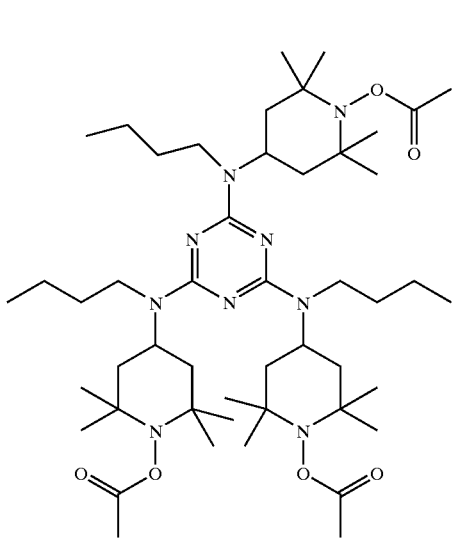 |
| 146 | 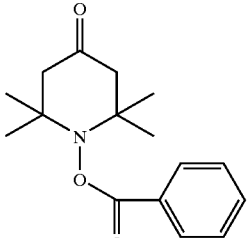 |

TABLE 1-continued

| Compound no. | Structural formula |
| --- | --- |
| 147 | [chemical structure: 2,2,6,6-tetramethylpiperidine with N-O-C(=O)-long alkyl chain and 4-O-acetyl group] |
| 148 | Polymer from [chemical structures: bis(2,2,6,6-tetramethyl-N-pivaloyloxy-piperidin-4-yl)-hexanediamine; cyanuric chloride (2,4,6-trichloro-1,3,5-triazine); N-butyl-N-(2,2,6,6-tetramethyl-N-pivaloyloxy-piperidin-4-yl)amine; di-n-butylamine] |
| 149 | Polymer from [chemical structures: bis(2,2,6,6-tetramethyl-N-acyloxy-piperidin-4-yl)-hexanediamine (acetyl and propionyl); cyanuric chloride; N-butyl-N-(2,2,6,6-tetramethyl-N-acetoxy-piperidin-4-yl)amine; di-n-butylamine] |
| 150 | Polymer from [chemical structures: 2,6-diethyl-2,3,6-trimethyl-1-hydroxy-4-hydroxypiperidine; terephthalic acid] |

TABLE 1-continued

| Compound no. | Structural formula |
| --- | --- |
| 151 | Polymer from [piperidine-N-OH with 4-OH substituent] and isophthalic acid |
| 152 | Polymer from [piperidine-N-OH with 4-OH substituent], terephthalic acid and isophthalic acid |
| 153 | Polymer from [piperidine-N-OH with 4-OH substituent] and adipic acid |
| 154 | Polymer from [piperidine-N-OH with 4-OH substituent], terephthalic acid and adipic acid |

The method may be carried out in any heatable vessel provided with a stirring device. Preferably, heating is carried out in a closed apparatus, with the exclusion of atmospheric oxygen, for example under an inert gas atmosphere (Ar or $N_2$), in a kneader, mixer or stirring vessel. It is, however, likewise possible to carry out the method in an extruder and also in the presence of air.

Addition to the polymer can be carried out in any conventional mixing apparatus wherein the polymer is melted and mixed with the additives. Suitable apparatus will be known to the person skilled in the art and, in the main, comprises mixers, kneaders and extruders.

A kneader or extruder is preferably used as the processing apparatus.

Especially preferred processing apparatuses are single-screw extruders, twin-screw extruders having screws rotating in the same direction or in opposite directions, planetary roller extruders, ring extruders and co-kneaders. Furthermore, processing machines which have at least one gas-removal zone and to which a partial vacuum can be applied may also be used. The gas-removal zone is used preferably for the removal of unreacted monomer or of by-products.

Suitable extruders and kneaders are described, inter alia, in *Handbuch der Kunststoffextrusion*, Vol. 1 Grundlagen, ed. F. Hensen, W. Knappe, H Potente, 1989, p. 3–7, ISBN:3-446-14339-4 (Vol. 2 *Extrusionsanlagen* 1986, ISBN 3-446-14329-7).

The screw length is, for example, from 1 to 60 times, and preferably from 35 to 48 times, the screw diameter. The speed of rotation of the screw is preferably from 10 to 400 revolutions per minute (rev./min.) and especially from 25 to 200 rev./min.

The maximum throughput is dependent on the screw diameter, speed of rotation and drive power. The method of the present invention may also be carried out at less than maximum throughput by varying the mentioned parameters or by working with weigh feeders.

When a plurality of components are added, they may be pre-mixed or may be added singly.

The polymers have to be subjected to an elevated temperature for an adequate period of time in order to bring about the desired grafting. The temperature is above the softening point in the case of amorphous polymers or above the melting point in the case of crystalline polymers.

The period of time required for the grafting reaction may vary according to the temperature, the amount of material to be grafted on and, where applicable, the type of extruder used. It is usually about from 10 seconds to 30 minutes, especially from 20 seconds to 10 minutes.

Alternatively, incorporation may also be carried out at temperatures which are not high enough to cause breakdown of the compounds according to the invention (latent compounds). The polymers prepared in that manner can then be heated a second time and subjected to an elevated temperature for an adequate period of time in order to bring about the desired grafting reaction.

It is also possible first to prepare a masterbatch from the hydroxylamine ester and the polymer, proceeding at a temperature which is not high enough for breakdown of the hydroxylamine ester to take place. The concentration of hydroxylamine ester in the masterbatch is typically from 1 to 20% by weight, preferably from 2 to 15% by weight and especially from 5 to 10% by weight, based on the polymer. The masterbatch can subsequently be further processed together with further polymer material and the unsaturated acid or acid derivative and reacted.

Heating to above the melting point is generally carried out with stirring until homogeneous distribution is achieved, the temperature being dependent upon the polymer used. In order to carry out the reaction, a temperature in the region between the melting point (crystalline polymers) or softening point (amorphous polymers) and a temperature about 10–150° C. above the melting/softening point is used.

Preferred processing temperatures for polyolefins that may be mentioned are: for LDPE 160–240° C., for HDPE 180–260° C., for PP 220–300° C. and for PP copolymers 180–280° C.

The invention relates also to a composition comprising a thermoplastic polymer, an unsaturated carboxylic acid or carboxylic acid derivative and a hydroxylamine ester having the structural unit of formula (I) or (I')

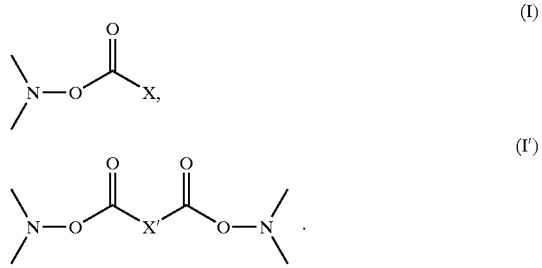

The invention relates also to a graft copolymer obtainable by the method described hereinbefore.

The invention relates likewise to the use of a hydroxylamine ester having a structural unit of formula (I) or (I') as an initiator for the grafting of an unsaturated carboxylic acid or carboxylic acid derivative onto a thermoplastic polymer and to the use of a graft copolymer obtainable according to the method described hereinbefore as a compatibiliser in polymer mixtures.

The definitions and preferred meanings of X and X' are mentioned hereinbefore. All further definitions and preferred meanings likewise apply to the composition and to the use.

Preparation of hydroxylamine esters that may advantageously be used in the above-mentioned method is described, for example, in U.S. Pat. Nos. 4,590,231, 5,300, 647, 4,831,134, 5,204,473, 5,004,770, 5,096,950, 5,021,478, 5,118,736, 5,021,480, 5,015,683, 5,021,481, 5,019,613, 5,021,486, 5,021,483, 5,145,893, 5,286,865, 5,359,069, 4,983,737, 5,047,489, 5,077,340, 5,021,577, 5,189,086, 5,015,682, 5,015,678, 5,051,511, 5,140,081, 5,204,422, 5,026,750, 5,185,448, 5,180,829, 5,262,538, 5,371,125, 5,216,156 and 5,300,544.

Further hydroxylamine esters and the preparation thereof are described in WO 01/90113.

In many cases it can be advantageous additionally to add free-radical-formers. Examples of free-radical-formers will be known to the person skilled in the art and are commercially available, for example:

2,2'-azo-bis(2-methyl-butyronitrile)=AIBN, 2,2'-azo-bis(2,4-dimethylvaleronitrile), 2,2'-azo-bis(4-methoxy-2,4-dimethylvaleronitrile), 1,1'-azo-bis(1-cyclohexanecarbonitrile), 2,2'-azo-bis(isobutyramide) dihydrate, 2-phenylazo-2,4-dimethyl-4-methoxyvaleronitrile, dimethyl-2,2'-azo-bisisobutyrate, 2-(carbamoylazo)isobutyronitrile, 2,2'-azo-bis(2,4,4-trimethylpentane), 2,2'-azo-bis(2-methylpropane), 2,2'-azo-bis(N,N'-dimethylene-isobutyro-amidine) in the free base or hydrochloride form, 2,2'-azo-bis(2-amidinopropane) in the free base or hydrochloride form, 2,2'-azo-bis{2-methyl-N-[1,1-bis(hydroxymethyl)ethyl]propionamide} or 2,2'-azo-bis{2-methyl-N-[1,1-bis(hydroxymethyl)-2-hydroxy-ethyl] propionamide}.

Acetylcyclohexane-sulfonyl peroxide, diisopropyl-peroxy-dicarbonate, tert-amyl perneodecanoate, tert-butyl perneodecanoate, tert-butyl perpivalate, tert-amyl perpivalate, di(2,4-dichlorobenzoyl) peroxide, diisononanoyl peroxide, didecanoyl peroxide, dioctanoyl peroxide, dilauroyl peroxide, di(4-methyl-benzoyl) peroxide, disuccinic acid peroxide, diacetyl peroxide, dibenzoyl peroxide=BPO, tert-butyl per-2-ethyl hexanoate, di(4-chloro-benzoyl) peroxide, tert-butyl perisobutyrate, tert-butyl permaleinate, 1,1-bis(tert-butylperoxy)-3,5,5-trimethylcyclohexane, 1,1-bis(tert-butylperoxy) cyclohexane, tert-butyl-peroxy-isopropyl carbonate, tert-butyl perisononanoate, 2,5-dimethylhexane-2,5-dibenzoate, tert-butyl peracetate, tert-amyl perbenzoate, tert-butyl perbenzoate, diisopropyl peroxydicarbonate, bis(4-tert-butylcyclohexyl) peroxydicarbonate, 2,2-bis(tert-butylperoxy)butane, 2,2-bis(tert-butyl-peroxy)propane, dicumyl peroxide=DCP, 2,5-dimethylhexane-2,5-di-tert-butyl peroxide; 3-tert-butylperoxy-3-phenyl phthalide, di-tert-amyl peroxide, 1,3-bis(tert-butylperoxy-isopropyl) benzene, 3,5-bis(tert-butylperoxy)-3,5-dimethyl-,2-dioxolane, di-tert-butyl peroxide, 2,5-dimethyl-hexyne-2,5-di-tert-butyl peroxide, n-butyl 4,4-di(tert-butylperoxy) valerate, ethyl 3,3-di(tert-butylperoxy)butyrate, di(1-hydroxycyclohexyl) peroxide, dibenzyl peroxide, tert-butyl-cumyl peroxide, 3,3,6,6,9,9-hexamethyl-1,2,4,5-tetraoxacyclononane, p-menthane hydroperoxide, pinane hydroperoxide, diisopropylbenzene mono-hydroperoxide, cumene hydroperoxide, methyl ethyl ketone peroxide and tert-butyl hydroperoxide.

There may also be mentioned commercially available 'C free-radical-formers', for example: 2,3-dimethyl-2,3-diphenylbutane, 3,4-dimethyl-3,4-diphenylhexane or poly-1,4-diisopropylbenzene.

Where appropriate, combinations of such free-radical-formers may also be used.

It has furthermore been found that it can be advantageous to carry out the grafting reaction in the presence of free nitroxyl radicals, usually in small amounts. As a result, an even better controlled reaction is achieved without the mechanical properties of the polymer, which are influenced by polymer breakdown or cross-linking, being impaired. Suitable nitroxyl radicals are known and described, for example, in U.S. Pat. No. 4,581,429 or EP-A-621 878. Open-chain structures are described, for example, in WO 99/03894 and WO 00/07981. Furthermore, piperidine derivatives are described in WO 99/67298 and GB 2 335 190. Heterocyclic compounds are to be found in GB 2 342 649.

The thermoplastic polymers may also comprise further additives. Examples include processing stabilisers, light stabilisers, fillers and pigments. Typical examples are mentioned hereinbelow.

1. Antioxidants 1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl) dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy -3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxy-benzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl) malonate, di-octadecyl-2-(3-tert-butyl-4-hydroxy-5-methylbenzyl)malonate, di-dodecylmercaptoethyl-2,2-bis (3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis (octylmercapto)-6-(3,5-di-tert-butyl-4-hydroxyanilino)-1,3, 5-triazine, 2-octylmercapto-4,6-bis(3,5-di-tert-butyl-4-hydroxyanilino)-1,3,5-triazine, 2-octylmercapto-4,6-bis(3, 5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris-(3,5-di-tert-butyl-4-hydroxyphenylethy)-1,3,5-triazine, 1,3,5-tris(3,5-di-tert-butyl-4-hydroxyphenylpropionyl)-hexahydro-1,3,5-triazine, 1,3,5-tris(3,5-dicycolohexyl-4-hydroxybezyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) pronionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl) oxamide, 3-thiaundecanol, 3-thiapentadecanol, trimethylhexanediol, trimethylolpropane, 4-hydroxymethyl- 1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3.5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard® XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyidiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyidiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetra-methylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV absorbers and light stabilisers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl) benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, where R=3'-tert-butyl-4'-hydroxy-5'-2H-benzotriazole-2ylphenyl, 2-[2'hydroxy-3'-(α,α-dimethylbenzyl)-5'(1,1,3,3tetramethyldutyl)phenyl]-benzotriazole; -2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3, 5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl) hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1, 2,3,4-butanetetracarboxylate, 1,1'-(1,2-ethanediyl)-bis(3,3, 5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperdyl) sebacate, bis(1-octyloxy-2,2,6,6-tetramethylpiperidyl) succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl) pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2, 6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-di-aza-4-oxo-spiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6, 6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1, 3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy) phenyl]-4,6-bis(2,4-dimethyl)-1,3,5-triazine, 2-[2-hydroxy-4-(2-hydroxy-3-octyloxypropyloxy)phenyl]4,6-bis(2,4-dimethyl)-1,3,5-triazine, 2-[4-(dodecyloxy/tridecyloxy-2-hydroxypropoxy)-2- hydroxyphenyl]4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2, 4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,4-dicumylphenyl) pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4, 6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl)methyl phosphite, bis(2,4-di-tert-butyl-6-methylphenyl)ethyl phosphite, 6-fluoro-2,4,8, 10-tetra-tert-butyl-12-methyl-dibenz[d,g]-1,3,2-dioxaphosphocin, 2,2',2''-nitrilo[triethyltris(3,3',5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:
Tris(2,4-di-tert-butylphenyl) phosphite (Irgafos® 9168, Ciba-Geigy), tris(nonylphenyl) phosphite,

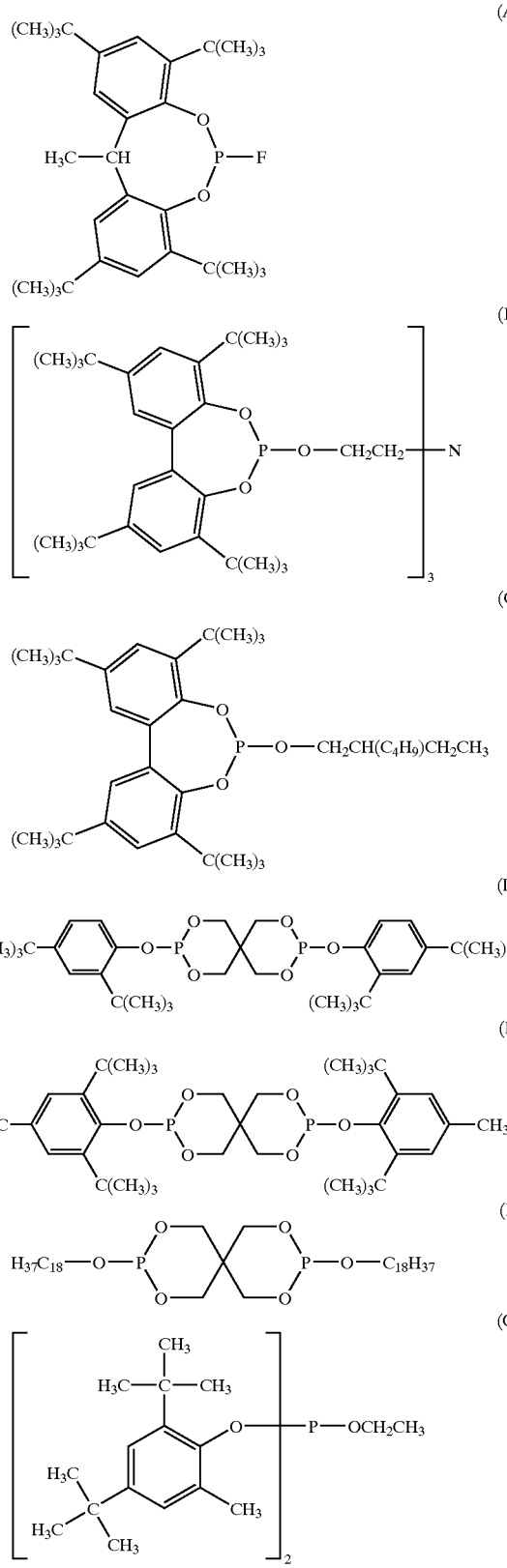

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example N-benzyl-alpha-phenylnitrone, N-ethyl-alpha-methyinitrone, N-octylalpha-heptyinitrone, N-lauryl-alpha-undecyinitrone, N-tetradecyl-alpha-tridecylnitrone, N-hexadecyl-alpha-pentadecylnitrone, N-octadecyl-alpha-heptadecyinitrone, N-hexadecyl-alpha-heptadecylnitrone, N-ocatadecyl-alpha-pentadecyinitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilisers, for example copper salts in combination with iodides and/or phosphorus compounds and salts of divalent manganese.

10. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

12. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butylbenzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3, 5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-benzofuran-2-one, 3-(2,3-dimethylphenyl)-5,7-di-tert-butylbenzofuran-2one.

Another embodiment of the invention is a method wherein additionally a stabilizer selected from the group consisting of a phenolic antioxidant, a phosphite or phosphonite and benzofuranone or indolinone is added to the thermoplastic polymer.

The following Examples illustrate the invention.

Grafting of Maleic Anhydride (MAH) onto a Polyolefin Using a Hydroxylamine Ester as Free-radical-generator Polypropylene, Profax 6501 from Basell having a melt flow rate, 230° C., 2.16 kg of MFR=6, is used as polymer.

The polymer is first mixed with max. 10% commercially available MAH (maleic anhydride). A solution of the hydroxylamine ester (NOR) (0.5–2.0% in 5 ml of pentane) is then sprayed on and the mixture is dried for 10 minutes at a pressure of 1 mbar and at room temperature in a vacuum drying cabinet. The mixture is then extruded (Haake TW 100) at 50 rev./min. and at a preset temperature (see Table). The extruded strand of polymer is then granulated and the MFR (melt flow rate, 230° C., 2.16 kg) is measured in accordance with ISO 1133. For, the FT-IR measurements (transmittance), the sample is dissolved in dichlorobenzene beforehand and reprecipitated from methanol, as a result of which non-bound MAH is removed.

TABLE 1

| Specimen | Temp. [° C.] | MAH [%] | NOR/ peroxide | NOR [%] | MFR | FT-IR (transm.) Signal ratio |
|---|---|---|---|---|---|---|
| Exxelor PO 1020 (Comp. Ex./ commercial prod.) | | | | | 105 | 0.45 |
| Comparison specimen | 220 | 2.5 | DCP | 0.5 | >200 | 0.60 |
| Example 1 | 220 | 10 | NOR 1 | 2.0 | 130 | 0.68 |
| Example 2 | 240 | 2.5 | NOR 1 | 0.5 | 25 | 0.55 |
| Example 3 | 220 | 10 | NOR 2 | 2.0 | 15 | 0.46 |
| Example 4 | 240 | 2.5 | NOR 2 | 0.5 | 20 | 0.42 |

Exxelor PO 1020 is a commercially available polypropylene grafted with maleic anhydride. It serves as relative standard. The signal ratio from the FT-IR transmittance measurement serves as reference for the Examples according to the invention. Similar or higher numerical values mean similar or higher grafted amounts.

FT-IR Data (Transmittance):

The ratio mentioned is calculated as the quotient of the MAH carbonyl band and a selected band characteristic of PP and is consequently a measure of the amount of grafted MAH. The higher the quotient, the higher the concentration of bound MAH.

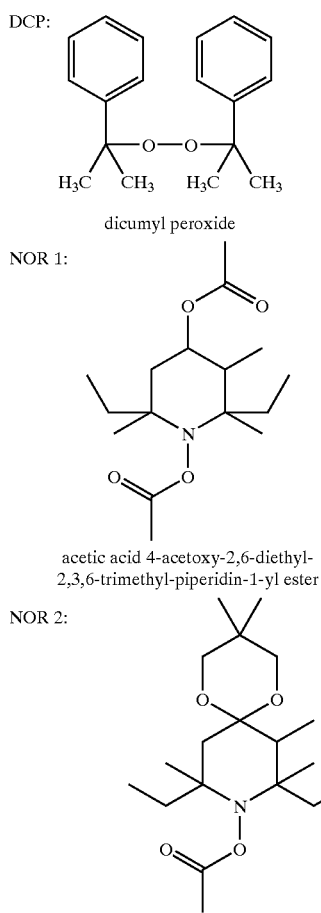

DCP:

dicumyl peroxide

NOR 1:

acetic acid 4-acetoxy-2,6-diethyl-2,3,6-trimethyl-piperidin-1-yl ester

NOR 2:

Acetic acid 8,10-diethyl-3,3,7,8,10-pentamethyl-1,5-dioxa-9-aza-spiro[5.5]undec-9-yl ester Grafting of Unsaturated Monomers onto Polypropylene In a double-scew extruder (TW 100 from Haake) with screws rotating in opposite directions, a commercially available polypropylene (Profax P H 350, manufacturer: Basell, MFR 230/2.16=5.8) is extruded at a temperature Tmax= 240° C. (heating zones 1–5) at 40 rev/min with the additives listed in Table 3.

The radical generator (NOR 3) is added as a melt compounded concentrate in polypropylene (Moplen HP 565S, manufacturer: Basell, MFR 230/2.16=37).

The extruded polymer is strand granulated and the MFR is determined in accordance with ISO 1133.

Free monomer is removed by dissolving the samples in decaline, precipitating in methanol and drying in a vacuum oven at 90° C.

TABLE 2

| | polymer | NOR 3/ [%] | Monomer/ [%] | MFR* | grafted monomer /[%] |
|---|---|---|---|---|---|
| Comparative example V1 (not extruded) | Exxelor PO 1020 | — | — | 105 | 0.3 |
| Comparative example V2 | Profax PH 350 | — | — | 6 | 0.0 |

TABLE 2-continued

| | polymer | NOR 3/ [%] | Monomer/ [%] | MFR* | grafted monomer /[%] |
|---|---|---|---|---|---|
| Example 5 | Profax PH 350 | 0.5 | maleic acid anhydride | 42 | 0.2 |
| Example 6 | Profax PH 350 | 1.0 | maleic acid anhydride | 92 | 0.4 |
| Example 7 | Profax PH 350 | 1.0 + 1.0 Nitroxyl 1 | maleic acid anhydride | 18 | 0.3 |
| Example 8 | Profax PH 350 | 0.5 | itaconic acid | 9 | 0.4 |

*MFR according to ISO 1133

NOR 3: Octadecanoic acid 9-acetoxy-3,8,10-triethyl-7,8,10-trimethyl-1,5-dioxa-9-aza-spiro[5.5]undec-3-ylmethyl ester

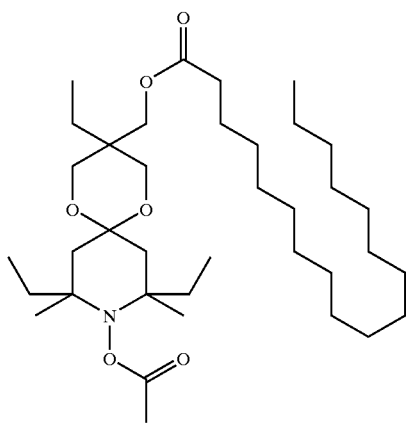

Nitroxyl 1: 4-hydroxy-2,2,6,6-tetramethylpiperidine-1-oxyl

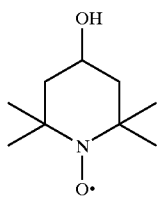

Determination of Grafted-acid [%] via Titration:

1 g of the precipitated polymer is dissolved in 50 ml decaline under nitrogen atmosphere. After addition of 20 ml ethylene glycol-KOH solution (0.1 M) the mixture is heated for 30 minutes at 120° C. After cooling down 10 ml water (at 80° C.) and 75 ml isopropanol (at room temperature) are added. Finally the acid content is determined by back titration with hydrochloric acid (0.1 M in water/Ethanol solution).

The examples according to the instant invention show a significant amount of polymer grafted monomer. In addition the MFR is substantially lower compared to the commercial product (Exxelor PO 1020) indicating a lower degradation of the polypropylene.

The addition of a nitroxyl-radical as co-additive again reduces the degradation of the polypropylene while maintaining the high grafting yield.

What is claimed is:

1. A method of grafting an unsaturated carboxylic acid derivative onto a thermoplastic polymer, which method comprises heating a mixture of thermoplastic polymer, unsaturated carboxylic acid or carboxylic acid derivative and a hydroxylamine ester having at least one structural unit of formula (I) or (I')

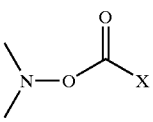 (I)

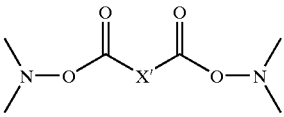 (I')

wherein

X is hydrogen, $C_1$–$C_{36}$alkyl, $C_1$–$C_{36}$ alkyl which is substituted by halogen, $C_5$–$C_{12}$cycloalkyl, $C_7$–$C_{12}$bicyclo- or tricycloalkyl, $C_2$–$C_{36}$alkenyl, $C_2$–$C_{18}$alkynyl, $C_6$–$C_{10}$aryl, —O—$C_1$–$C_{18}$alkyl, —O—$C_6$–$C_{10}$aryl, —NH—$C_1$–$C_{18}$alkyl, —NH—$C_6$–$C_{10}$aryl, —N($C_1$–$C_6$alkyl)$_2$; and X' is a direct bond or $C_1$–$C_{36}$alkylene, $C_2$–$C_{36}$alkenylene, $C_2$–$C_{36}$alkynylene, —($C_1$–$C_6$alkylene)-phenyl-($C_1$–$C_6$alkylene) or a group

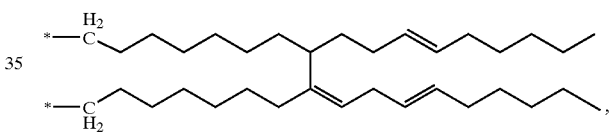

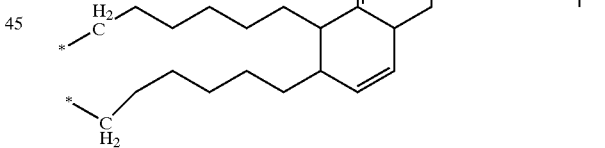

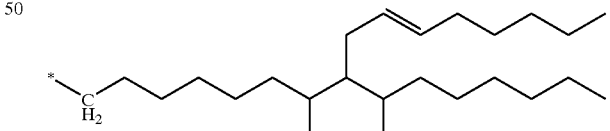

or

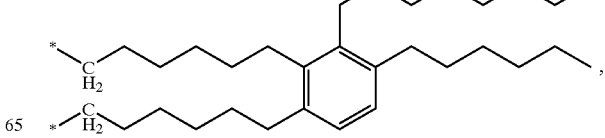

in a processing apparatus for thermoplastic polymers, to above the softening point or melting point of the thermoplastic polymer and allowing the components of the mixture to react with one another.

2. A method according to claim 1, wherein the thermoplastic polymer is selected from the group consisting of polyolefin, styrene block copolymer, polybutadiene, polyisoprene, EPDM (ethylene-propylene diene monomer) and EPR (ethylene-propylene elastomer).

3. A method according to claim 1, wherein the components are allowed to react at a temperature of from 160° C. to 280° C.

4. A method according to claim 1, wherein the unsaturated carboxylic acid or unsaturated carboxylic acid derivative is selected from the group consisting of an anhydride of an unsaturated dicarboxylic acid, an ester or diester of an unsaturated mono- or di-carboxylic acid and an amide of an unsaturated mono- or di-carboxylic acid.

5. A method according to claim 4, wherein the unsaturated carboxylic acid or unsaturated carboxylic acid derivative has from 3 to 40 carbon atoms.

6. A method according to claim 4, wherein the unsaturated carboxylic acid or unsaturated carboxylic acid derivative is selected from the group consisting of maleic anhydride, maleic acid, fumaric acid, acrylic acid, methacrylic acid, crotonic acid, isocrotonic acid, vinylacetic acid, oleic acid, elaidic acid, linoleic acid, linolenic acid, aconitic acid, itaconic acid and norbornenedicarboxylic anhydride.

7. A method according to claim 1, wherein the unsaturated carboxylic acid or unsaturated carboxylic acid derivative is used in an amount of from 0.5 to 20% by weight, based on the weight of the thermoplastic polymer.

8. A method according to claim 1, wherein the hydroxylamine ester is a compound of formula (Ia) or (I'a)

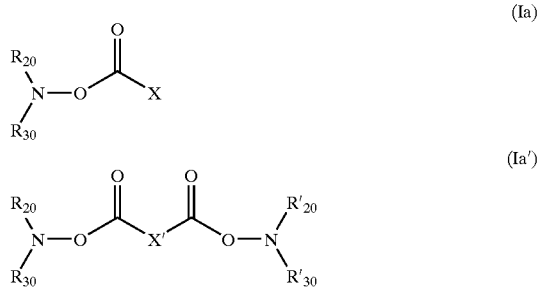

wherein

X is hydrogen, $C_1$–$C_{38}$alkyl, $C_1$–$C_{38}$alkyl which is substituted by halogen, $C_5$–$C_{12}$cycloalkyl, $C_7$–$C_{12}$bicyclo- or tricycloalkyl, $C_2$–$C_{36}$alkenyl, $C_2$–$C_{18}$alkynyl, $C_6$–$C_{10}$aryl, —O—$C_1$–$C_{18}$alkyl, —O—$C_6$–$C_{10}$aryl, —NH—$C_1$–$C_{18}$alkyl, —NH—$C_6$–$C_{10}$aryl, —N($C_1$–$C_6$alkyl)$_2$;

X' is a direct bond or $C_1$–$C_{36}$alkylene, $C_2$–$C_{36}$alkenylene, $C_2$–$C_{36}$alkynylene, phenylene, —($C_1$–$C_6$alkylene)-phenyl-($C_1$–$C_6$alkylene) or a group

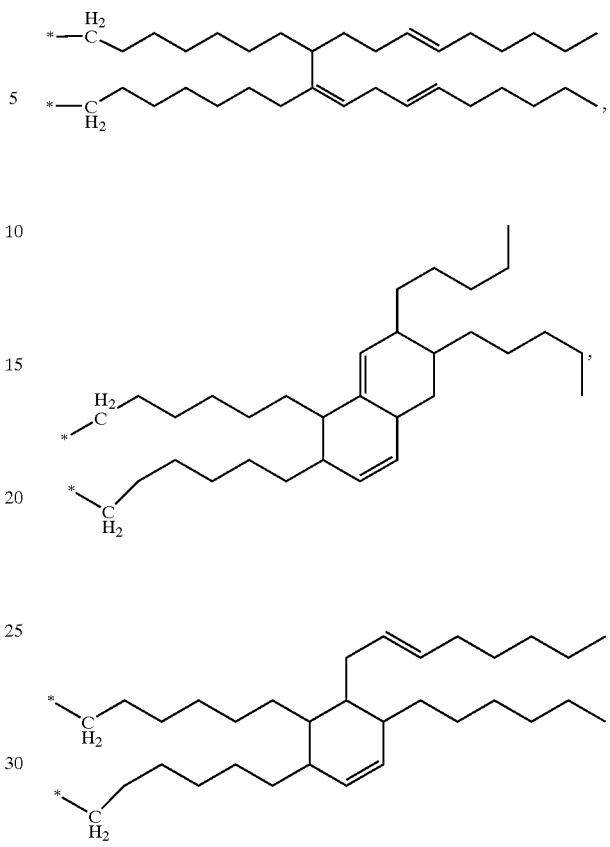

or

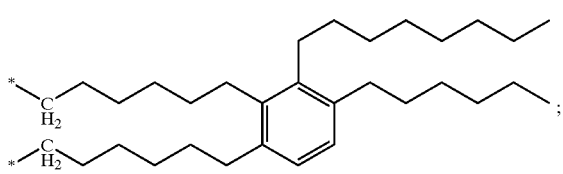

$R_{20}$, $R'_{20}$, $R_{30}$ and $R'_{30}$ are each independently of the others unsubstituted, halo-, CN—, $NO_2$— or —COOR$_{40}$-substituted or O— or NR$_{40}$-interrupted $C_1$–$C_{18}$alkyl, $C_2$–$C_{18}$alkenyl, $C_2$–$C_{18}$alkynyl; and $R_{40}$ is hydrogen, phenyl or $C_1$–$C_{18}$alkyl; or $R_{20}$ and $R_{30}$ and/or $R'_{20}$ and $R'_{30}$, together with the nitrogen atom to which they are bonded, form a 5- or 6-membered ring which may be interrupted by a nitrogen or oxygen atom and which may be substituted one or more times by $C_1$–$C_6$alkyl groups and carboxyl groups.

9. A method according to claim 8, wherein the hydroxylamine ester is of formula (Ia) wherein $R_{20}$ and $R_{30}$, together with the nitrogen atom to which they are bonded, form a piperidine ring which is substituted in the 2,2- and 6,6-positions by $C_1$–$C_4$alkyl groups and in the 4-position by an ether, amine, amide, urethane, ester or ketal group.

10. A method according to claim 8, wherein the hydroxylamine ester is a compound of formula (A), (B), (C) or (O)

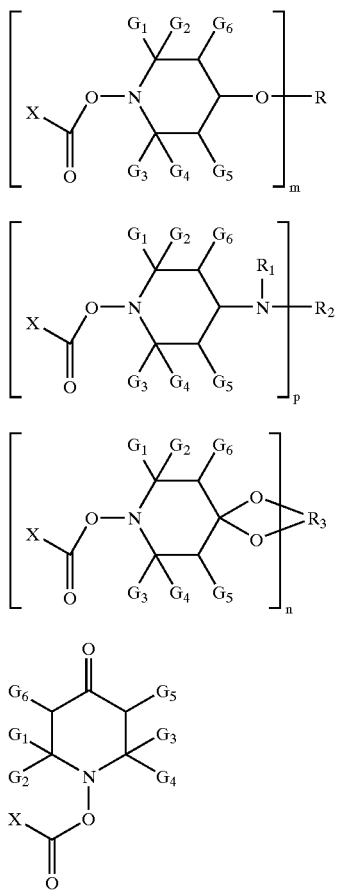

wherein
- $G_1$, $G_2$, $G_3$ and $G_4$ are each independently of the others alkyl having from 1 to 4 carbon atoms;
- $G_5$ and $G_6$ are each independently of the other hydrogen or $C_1$–$C_4$alkyl;
- m is a number 1–2;
- R, when m is 1, is hydrogen, uninterrupted $C_1$–$C_{18}$alkyl or $C_2$–$C_{18}$alkyl interrupted by one or more oxygen atoms, or is cyanoethyl, benzoyl, glycidyl, a monovalent radical of an aliphatic carboxylic acid having from 2 to 18 carbon atoms, of a cycloaliphatic carboxylic acid having from 7 to 15 carbon atoms or of an α,β-unsaturated carboxylic acid having from 3 to 5 carbon atoms or of an aromatic carboxylic acid containing from 7 to 15 carbon atoms, it being possible for each carboxylic acid to be substituted in the aliphatic, cycloaliphatic or aromatic unit by from 1 to 3 groups —$COOZ_{12}$ wherein $Z_{12}$ is hydrogen, $C_1$–$C_{20}$alkyl, $C_3$–$C_{12}$alkenyl, $C_5$–$C_7$cycloalkyl, phenyl or benzyl; or R is a monovalent radical of a carbamic acid or phosphorus-containing acid or is a monovalent silyl radical;
- R, when m is 2, is $C_2$–$C_{12}$alkylene, $C_4$–$C_{12}$alkenylene, xylylene, a bivalent radical of an aliphatic dicarboxylic acid having from 2 to 36 carbon atoms or of a cycloaliphatic or aromatic dicarboxylic acid having from 8 to 14 carbon atoms or of an aliphatic, cycloaliphatic or aromatic dicarbamic acid having from 8 to 14 carbon atoms, it being possible for each dicarboxylic acid to be substituted in the aliphatic, cycloaliphatic or aromatic unit by one or two groups —$COOZ_{12}$; or
- R is a bivalent radical of a phosphorus-containing acid or a bivalent silyl radical;
- p is 1,
- $R_1$ is $C_1$–$C_{12}$alkyl, $C_5$–$C_7$cycloalkyl, $C_7$–$C_8$aralkyl, $C_2$–$C_{18}$alkanoyl, $C_3$–$C_5$alkenoyl or benzoyl;
- $R_2$ is $C_1$–$C_{18}$alkyl, $C_5$–$C_7$cycloalkyl, $C_2$–$C_8$alkenyl, each unsubstituted or substituted by a cyano, carbonyl or carbamide group, or is glycidyl, a group of formula —$CH_2CH(OH)$—Z or of formula —CO—Z or —CONH—Z, wherein Z is hydrogen, methyl or phenyl;
- n is a number 1 or 2;
- when n is 1,
  - $R_3$ is $C_2$–$C_8$alkylene or hydroxyalkylene or $C_4$–$C_{36}$acyloxyalkylene; and
- when n is 2,
  - $R_3$ is (—$CH_2$)$_2$C($CH_2$—)$_2$ and
- X is as defined in claim 8.

11. A method according to claim 8, wherein the substituent X is selected from the group consisting of $C_1$–$C_{38}$alkyl, $C_2$–$C_{19}$alkenyl and $C_6$–$C_{10}$aryl.

12. A method according to claim 1, wherein the hydroxylamine ester is an oligomer or polymer obtained by reacting a dicarboxylic acid with a compound of formula A1 or B1 or by reacting a diisocyanate with a compound of formula A1

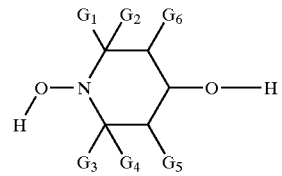

A1

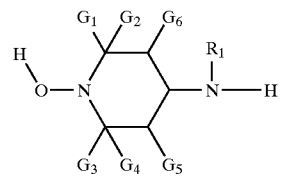

B1 wherein $G_1$, $G_2$, $G_3$ and $G_4$ are each independently of the others $C_1$–$C_4$alkyl, or $G_1$ and $G_2$ together and $G_3$ and $G_4$ together, or $G_1$ and $G_2$ together or $G_3$ and $G_4$ together are pentamethylene;

$G_5$ and $G_6$ are each independently of the other hydrogen or $C_1$–$C_4$alkyl; and $R_1$ is $C_1$–$C_{12}$alkyl, $C_5$–$C_7$cycloalkyl, $C_7$–$C_8$aralkyl, $C_2$–$C_{18}$alkanoyl, $C_3$–$C_5$alkenoyl or benzoyl.

13. A method according to claim 1, wherein the hydroxylamine ester is used in an amount of from 0.01 to 5% by weight, based on the weight of the thermoplastic polymer.

14. A method according to claim 1, wherein a kneader or extruder is used as the processing apparatus.

15. A method according to claim 1 wherein additionally a stabilizer selected from the group consisting of a phenolic antioxidant, a phosphite or phosphonite and a benzofuranone or indolinone is added.

16. A composition comprising a thermoplastic polymer, an unsaturated carboxylic acid or carboxylic acid derivative and a hydroxylamine ester having the structural unit of formula (I) or (I') according to claim 1.

17. A graft copolymer obtained according to the method according to claim 1.

* * * * *